US010391433B2

(12) United States Patent
Wang et al.

(10) Patent No.: US 10,391,433 B2
(45) Date of Patent: Aug. 27, 2019

(54) OPALINE BIOGENIC SILICA/EXPANDED PERLITE COMPOSITE PRODUCTS

(71) Applicant: EP Minerals, LLC, Reno, NV (US)

(72) Inventors: Qun Wang, Reno, NV (US); Scott Kevin Palm, Reno, NV (US); Peter E. Lenz, Reno, NV (US)

(73) Assignee: EP MINERALS, LLC, Reno, NV (US)

( * ) Notice: Subject to any disclaimer, the term of this patent is extended or adjusted under 35 U.S.C. 154(b) by 94 days.

(21) Appl. No.: 15/524,566

(22) PCT Filed: Dec. 14, 2015

(86) PCT No.: PCT/US2015/065572
§ 371 (c)(1),
(2) Date: May 4, 2017

(87) PCT Pub. No.: WO2016/100217
PCT Pub. Date: Jun. 23, 2016

(65) Prior Publication Data

US 2017/0368486 A1 Dec. 28, 2017

Related U.S. Application Data

(60) Provisional application No. 62/245,716, filed on Oct. 23, 2015, provisional application No. 62/094,756, filed on Dec. 19, 2014.

(51) Int. Cl.
*B01D 39/06* (2006.01)
*B01D 39/20* (2006.01)
(Continued)

(52) U.S. Cl.
CPC ............ *B01D 39/06* (2013.01); *B01D 37/02* (2013.01); *B01D 39/2075* (2013.01); *B01J 20/14* (2013.01); *C02F 1/286* (2013.01)

(58) Field of Classification Search
CPC .... B01D 39/06; B01D 39/2075; B01D 37/02; B01J 20/14; C02F 1/286
See application file for complete search history.

(56) References Cited

U.S. PATENT DOCUMENTS 4,238,334 A 12/1980 Halbfoster
5,019,311 A 5/1991 Koslow
(Continued)

FOREIGN PATENT DOCUMENTS

CL 199801873 4/1999
CN 1079829 C 2/2002
(Continued)

OTHER PUBLICATIONS

Smith, D. (1998). Opal, cristobalite, and tridymite: Noncrystallinity versus crystallinity, nomenclature of the silica minerals and bibliography. Powder Diffraction, 13(1), 2-19. doi:10.1017/S0885715600009696 (Year: 1998).*
(Continued)

*Primary Examiner* — Liam Royce

(57) ABSTRACT

A powdered composite filtration medium includes composite particles that include at least one diatomite particle and at least one expanded perlite particle sintered together. The composite powdered filtration medium may include from about 7 wt % to about 90 wt % diatomite, from about 93 wt % to about 10 wt % expanded perlite. Less than about 1% total crystalline silica may be present in the medium. The medium may have a permeability of at least 0.25 darcy. The diatomite and expanded perlite may be sintered or calcined with or without a fluxing agent.

8 Claims, 7 Drawing Sheets

(51) Int. Cl.

| | |
|---|---|
| ***B01D 37/02*** | (2006.01) |
| ***B01J 20/14*** | (2006.01) |
| ***C02F 1/28*** | (2006.01) |

(56) References Cited

U.S. PATENT DOCUMENTS

| | | | | |
|---|---|---|---|---|
| 5,102,538 | A | 4/1992 | Weiergraber | |
| 5,179,062 | A | 1/1993 | Dufour | |
| 5,356,446 | A | 10/1994 | Smetana et al. | |
| 5,656,568 | A | 8/1997 | Shiuh et al. | |
| 5,710,090 | A | 1/1998 | Dufour | |
| 5,776,353 | A | 7/1998 | Palm et al. | |
| 6,464,770 | B1 | 10/2002 | Palm et al. | |
| 6,521,290 | B1 | 2/2003 | Kudo et al. | |
| 6,524,489 | B1 | 2/2003 | Palm et al. | |
| 6,712,974 | B1 | 3/2004 | Palm et al. | |
| 7,074,969 | B2 | 7/2006 | Sunkara et al. | |
| 7,264,728 | B2 | 9/2007 | Gibson et al. | |
| 7,374,684 | B2 | 5/2008 | Gibson et al. | |
| 7,497,903 | B2 | 3/2009 | Wang et al. | |
| 7,531,632 | B2 | 5/2009 | Perreault | |
| 7,850,012 | B2 | 12/2010 | Gibson et al. | |
| 8,084,392 | B2 | 12/2011 | Lenz et al. | |
| 8,663,475 | B2 | 3/2014 | Lu | |
| 8,759,559 | B2 | 6/2014 | Sunkara et al. | |
| 2003/0127022 | A1 | 7/2003 | Palm et al. | |
| 2009/0181848 | A1 | 7/2009 | Lenz et al. | |
| 2009/0261041 | A1 | 10/2009 | Hu et al. | |
| 2010/0126388 | A1 | 5/2010 | Wang | |
| 2011/0195168 | A1 | 8/2011 | Wang | |
| 2012/0046165 | A1 | 2/2012 | Lu et al. | |
| 2014/0000487 | A1 * | 1/2014 | Wang | C08K 3/34 106/482 |
| 2014/0171305 | A1 | 6/2014 | Nannini et al. | |
| 2014/0353243 | A1 | 12/2014 | Wang et al. | |
| 2014/0371061 | A1 | 12/2014 | Riley | |

FOREIGN PATENT DOCUMENTS

| | | | |
|---|---|---|---|
| CN | 1656911 | A | 8/2005 |
| CN | 103068250 | A | 4/2013 |
| EP | 2160457 | A1 | 3/2010 |
| WO | 9729829 | | 8/1997 |
| WO | 2008030715 | A2 | 3/2008 |
| WO | 2010042614 | A1 | 4/2010 |
| WO | 2013014450 | A1 | 1/2013 |
| WO | 2014004349 | A1 | 1/2014 |
| WO | 2014092868 | A1 | 6/2014 |
| WO | 2015100050 | A1 | 7/2015 |

OTHER PUBLICATIONS

Smith, D. (1998). Opal, cristobalite, and tridymite: Noncrystallinity versus crystallinity, nomenclature of the silica minerals and bibliography. Powder Diffraction, 13(1), 2-19. doi:10.1017/S0885715600009696 (Year: 1998).*

Ediz et. al. 2010 "Improvement in filtration characteristics of diatomite by calcination" International Journal of Mineral Processing 94 (2010)129-134 (Year: 2010).*

International Search Report related to Application No. PCT/US2015/065572 dated Feb. 23, 2016.

"Diatomite Processing" Nov. 1995—Diatomite Processing 11.22-1.

C.L. Timothy R. Smith, Letter to FDA, 2001 Website: https://www.fda.gov/downloads/food/ingredientspackaginglabeling/gras/noticeinventory/ucm261673.pdf.

Extended European Search Report related to Application No. 15870807.3 (regional entry of International Application No. PCT/US2015/065572) dated Jun. 13, 2018.

Chilean Office Action related to Application No. 201701309, dated Sep. 7, 2018.

European Office Action related to Application No. 15870807.3 dated Feb. 6, 2019.

European Extended Search Report related to Application No. 16857918.3 (Regional Stage Entry of PCT/US2016037826), dated on Feb. 11, 2019.

European Extended Search Report related to Application No. 16857917.5 (Regional Stage Entry of PCT/US2016037816), dated Feb. 11, 2019.

Chilean Office Action related to Application No. 201701309 dated Mar. 1, 2019.

European Extended Search Report related to Application No. 16857919.1 (Regional Stage Entry of PCT/US2016037830), dated Apr. 26, 2019.

Elzea J M et al: "Distinguishing well ordered opal-CT and opal-C from high temperature cristobalite by x-ray diffraction", Analytica Chimica Acta, Elsevier, Amsterdam, NL, vol. 286, No. 1, Feb. 10, 1994 (Feb. 10, 1994), pp. 107-116, XP026633923, ISSN: 0003-2670, D0I: 10.1016/0003-2670(94)80182-7 [retrieved on Feb. 10, 1994].

S. Hillier et al: "Distinguishing opaline silica from cristobalite in bentonites: a practical procedure and perspective based on Na0H dissolution", Clay Minerals, vol. 43, No. 3, Sep. 1, 2008 (Sep. 1, 2008), pp. 477-486, XP055377502, GB ISSN: 0009-8558, D0I 10.1180/claymin.2008.043.3.11.

* cited by examiner

OPALINE BIOGENIC SILICA/EXPANDED PERLITE COMPOSITE PRODUCTS

CROSS-REFERENCE TO RELATED PATENT APPLICATIONS

This patent application is a 35 U.S.C. § 371 U.S. national stage filing of International Application No. PCT/US2015/065572 filed on Dec. 14, 2015, and claims the benefit of U.S. Provisional Patent Application No. 62/094,756, filed Dec. 19, 2014 and U.S. Provisional Patent Application No. 62/245,716, filed Oct. 23, 2015.

TECHNICAL FIELD

This disclosure concerns composite products comprising opaline biogenic silica intimately and directly bound to expanded perlite. More specifically, this disclosure relates to powdered diatomite/expanded perlite composite filtration media containing very low or non-detectable levels of crystalline silica and possessing attractive extractable chemical compositions and other properties suitable for use in filtration applications traditionally served by diatomite or perlite filtration media. Also disclosed are related processes, process conditions, batch chemistries and analytic techniques.

BACKGROUND

Powdered filtration media are capable of separating fine particles from a wide variety of liquids and are also used in selected air filtration processes. Materials used for powdered filtration media include processed forms of biogenic silica, including diatomite and rice hull ash, diatomite, expanded perlite, expanded volcanic ash, expanded pumice, and cellulose. A wide variety of filters utilize powdered filtration media, such as fixed bed filters and vacuum or pressure filters. Further, powdered filtration media can serve as a pre-coat or body-feed for pressure filters or a pre-coat in rotary vacuum precoat filtration (drum filters). While the exact removal of particles suspended in a liquid can vary based on the liquid, the processing conditions and the particles, in general, it is believed that diatomite may remove particles as small as about 0.5 microns from liquids, while expanded perlite is better suited for coarser particles of about 5 microns or larger.

Diatomite consists of the skeletal remains of certain algae, generally referred to as diatom frustules. Diatom frustules consist of relatively pure (98-99.5 wt %) amorphous and hydrated silica in form of opal-A. In addition to diatom frustules, diatomite ore generally incorporates other minerals and rocks, such as clays, feldspars, quartz, volcanic ash and other impurities. Besides free moisture, bound water and organic contaminants, diatomite ore usually contains about 80-95 wt % amorphous silica and about 5-20 wt % other minerals. As a result, diatomite raw materials that are either used as natural products or as feed for further processing contain a mineral system, not just the pure diatom frustules, and the existence of this mineral system places constraints on many of the properties, such as extractable chemistry, density, permeability and mineralogy, including crystalline silica content.

After it is mined, crushed and dried, diatomite ore may be classified to remove some of the mineral impurities. U.S. Pat. Nos. 5,656,568 and 6,653,255 teach a method for making high purity diatomite products by wet beneficiation and acid wash. While the removal of some non-diatomderived minerals can improve some product properties, such as extractable chemistry and density, it can also have a negative impact on some other properties, such as permeability, as some of the other minerals often found with diatomite can aid in the agglomeration of particles during calcination and flux calcination.

Calcination and flux-calcination, the common terms used to describe processes used to agglomerate the particles contained in diatomite ore, increase the average particle size, porosity and permeability of the products. In both calcination processes, diatomite powder is commonly heated in a rotary kiln.

Flux-calcination is similar to straight calcination, but includes the addition of a fluxing agent to the diatomite powder, usually soda ash, before the calcining step. Adding a fluxing agent further promotes sintering of the diatomite particles and increases the average particle size, porosity and the permeability beyond that achieved by straight calcination.

While other fluxes have been used in small quantities over the years, sodium-based fluxes, including soda ash (sodium carbonate) and common salt (sodium chloride) have been the most popular fluxes. Various other fluxes are described in the prior art, including other alkali metal fluxes. For the purposes of this disclosure, we include the following metals as alkali metals: lithium, sodium, potassium, rubidium, cesium and francium.

In summary, calcined diatomite is more permeable and has a larger average particle size than un-calcined or natural diatomite, and flux-calcined diatomite is more permeable and has a larger average particle size than both calcined and natural diatomite.

Perlite is a volcanic rock of alumino-silicate glass formed through the rapid cooling of magma or lava of a rhyolitic composition, followed by hydration. Perlite typically contains about 2-5 wt % bound water that causes the perlite to expand or "pop" when the perlite is rapidly heated to a temperature range of 1600-2000° F. (871-1093° C.). During expansion, the water contained in perlite turns to steam and, as the perlite softens, it expands rapidly. Perlite is thermally expanded to make low density, powdered products for use in a variety of applications, including liquid filtration. For filtration applications, expanded perlite is milled at various levels of intensity and is then classified to produce powdered filtration media products of different particle size distributions and permeabilities. Volcanic ash, tuff, obsidian and pumice are also hydrated natural glasses of volcanic origin possessing compositions similar to that of perlite. For the purposes of this disclosure, the term "perlite" includes all types of hydrated natural volcanic glasses.

Upon expansion, perlite may form enclosed spheres with little or no open pore structure. These enclosed spheres are referred to as "floaters." While floaters may be useful for some applications, such as in insulation or horticulture, when used as powdered filtration media, floaters are buoyant, may not actively filter small particles and can damage certain types of filtration equipment. As a result, producers of powdered perlite filtration media mill the expanded perlite to open the pore structures of the particles thereby reducing the floater content. The coarser or more permeable grades of expanded perlite normally contain more floaters than the finer or less permeable grades of expanded perlite.

Common crystalline silica minerals include quartz, tridymite and cristobalite, and less common or rarer are melanophlogite, moganite, keatite, coesite, stichovite and seiferite. The presence of crystalline silica in a powdered product can be concerning because small crystalline silica particles can be inhaled, and prolonged exposure to respirable crystalline silica particles may lead to undesirable health effects. As a result, there is a need for powdered filtration media products that possess the desirable filtration characteristics of diatomite but which contain reduced or non-detectable levels of crystalline silica.

Current regulations require that a product sold in the United States without a warning label must contain less than 0.1 wt % total crystalline silica, and in Europe, any product without a warning label must contain less than 1 wt % respirable crystalline silica. Particles finer than 10 micrometers are considered respirable. The respirability describes the probability of a particle of a certain size being inhaled into a human lung. The respirability of a particle increases with its decreasing size and is described by a respirability function. For example, particles of 10 micrometers and larger have a respirability of 0%, those of 1 micrometer have a respirability of 94.8% and for those of 0.1 micrometer have a respirability of 99.5%. Content of respirable particles in a powdered material is generally calculated based on the content and particles size distribution of such particles finer than 10 micrometers. The content of respirable crystalline silica in a sub-10-micrometer size fraction in a powder material commonly is computed based on three factors: the content of the particle size fraction in the powder material, respirability of the size fraction and the content of crystalline silica in the size fraction. The total respirable crystalline silica content of a powder material is then calculated by the summation of the contents of respirable crystalline silica in all sub-10-micrometer fractions.

Opals are amorphous hydrated silica minerals and are characterized by the existence of spherical nano-clusters of hydrated silica and adsorbed water. Naturally occurring common opaline minerals are opal-A, opal-CT and opal-C. Opal-A can form naturally from supersaturated aqueous solutions of silicic acid, but is more commonly formed in biological processes by various species of plants, such as diatoms, bamboo, rice plants and a number of other plant species. Partial dehydration and heating, either geologically or artificially, of opal-A brings short range ordering and transforms it to opal-CT or opal-C, depending on the degree of ordering and level of dehydration. Opaline silicas are non-crystalline and, at this time, the risks of inhaling opaline silica dusts have not been demonstrated to be harmful.

Most diatomite ores contain crystalline silica, in the form of quartz, and the removal of this quartz from these ores is sometimes difficult or impossible. During both calcination and flux-calcination of diatomite, a mineral phase change occurs in which some of the amorphous silica is dehydrated and converted from opal-A to opal-CT or opal-C and, in some cases to crystalline silica, most commonly in the form of cristobalite (and less commonly, quartz).

Opal-C is often formed during the calcining process, and until recently it has not been possible to distinguish opal-C from cristobalite in calcined or flux calcined diatomite. Lenz et al., in a recently filed United States provisional patent application (Ser. No. 62/245,716) teaches a method to distinguish opals from cristobalite, and the present disclosure makes use of this teaching.

Opal-C may be converted to cristobalite with further heating, and this transformation of opal-C can be promoted by the addition of a fluxing agent, especially a fluxing agent containing sodium. A fluxing agent, when used in calcination, reduces the softening or melting temperature and viscosity of amorphous biogenic silica, and can result in the formation of increased levels of cristobalite when the silica cools after the flux calcining process is complete.

Without being bound by theory, it is believed that sodium fluxing agents may increase or enhance cristobalite formation during flux-calcination because of the small ionic radius of sodium, which allows sodium ions to fit into the lattice interstitials of the cristobalite crystalline structure. While other alkali metal salts, especially potassium salts, have been proposed for use as low cristobalite fluxing agents for diatomite agglomeration, there is still some formation of cristobalite when these agents are used. Furthermore, cristobalite formation during calcination of diatomite increases with the use of higher calcination temperatures and/or longer heating periods, as well as the use and dosage of a fluxing agent. As a result, straight-calcined and flux-calcined diatomite may contain cristobalite from very low levels up to as much as 80 wt % or more.

As discussed above, in many cases calcination of diatomite transforms, partially, the opaline silica from opal-A to opal-C. Further heating, and in many cases further heating assisted by a sodium fluxing agent, transforms opal-C to cristobalite. Due to the close proximity between primary peaks of opal-CT, opal-C and cristobalite x-ray diffraction (XRD) patterns, opal-CT and opal-C in diatomite products have been traditionally attributed to cristobalite. As mentioned above, a powder XRD scan method was recently developed by Lenz et al. to differentiate opal-C and opal-CT from cristobalite, and this technique has been used to differentiate cristobalite from opals in the present disclosure.

The diffraction pattern of cristobalite contains sharp Bragg's peaks, most notably at 22.02°. 36.17°, 31.50°, and 28.49° 2θ with Cu Kα x-ray (λ=1.54056 Å). The diffraction patterns of opal-C and opal-CT are less well-defined, with broader and fewer peaks that may be indicative of radial scattering and not true Bragg's peaks. All three share a similar primary peak near 22° 2θ which corresponds to a d-spacing approximate 4.0 Å according to the Bragg law and a secondary peak near 36° 2θ. But the peaks near 31.5° and 28.5° 2θ are very poorly developed for opal-C or are missing for opal-CT. In summary, the opal-C and opal-CT diffraction patterns differ from that of cristobalite in the following ways: a primary peak at a slightly lower 2θ angle or higher d-spacing than 4.03 Å for cristobalite, a broader primary peak as measured using the FWHM (full width at half maximum) statistic, lack of defined peaks at 31.5° and 28.49° 2θ, and a much more significant amorphous background. For example, Elzea and Rice (Clays and Clay Minerals, vol. 44, pp. 492-500, 1996) presents XRD patterns of 24 opal-C and opal-CT samples which have d-spacings ranging from 4.03 to 4.11 Å, between that of samples of cristobalite (4.03 Å) and tridymite (4.11 Å), and FWHM from 0.2 to 1.0° 2θ, well above that of about 0.15° 2θ for samples of cristobalite and <0.20 2θ for tridymite.

Perlite ores may also contain different levels of unexpandable minerals, such as rhyolite, feldspar and quartz. After expansion, the perlite may be processed to remove heavier, unexpanded mineral particles. Even with post-expansion separation processes, many expanded perlite products may still contain some crystalline silica in the form of quartz.

When a liquid passes through a powdered filtration media, soluble components of the filtration media may dissolve into the liquid and eventually remain in the filtered liquid. Users of powdered filtration media often set limits on the amount and type of soluble components that can pass into the filtered liquid. In addition, many countries establish acceptable levels of dissolved components in products that pass through powdered filtration media, such as food and pharmaceutical products. For example, in the United States, the Food Chemicals Codex (FCC) includes standards with regard to the purity and quality of certain products that involve food or beverage processing. In addition, industrial associations have set standard analytic methods for quality and purity. For example, beer is typically filtered using a powdered filtration media, such as a calcined or flux-calcined diatomite. Solubility of a substance from a powdered filter media varies with the extraction method (for example, the type of solvent and the conditions under which a powdered filtration medium is in contact with the solvent). The American Society of Brewing Chemists (ASBC) and the European Brewery Convention (EBC) have both set standard analytical methods for extractable or soluble content of iron from powdered filtration media.

The permeability of powdered filtration media is a measure of the rate at which a standard liquid can pass through a standard preparation of the media under standard conditions in the unit of "darcy." A 1-darcy medium, when constructed to have a 1-cm$^2$ surface area and a 1-cm thickness, will allow a 1-centipoise (1-mPa-s) viscosity liquid (e.g., water at 20° C.) to pass through at a rate of 1 milliliter (ml) per second under a differential pressure of 1 atmosphere (101,325 Pascal). Common powdered filtration media can have permeabilities ranging from less than 0.01 to about 20 darcy or more. For powdered filtration media, especially for products composed of diatomite, there is a reasonably predictable relationship between permeability and the ability of the media to remove particles from liquids, often referred to as particle size exclusion. Specifically, powdered filtration media with low permeabilities generally are able to remove finer particles from liquids than powdered filtration media with high permeabilities. Higher permeability powdered filter media usually are able to filter a liquid at a higher throughput but at the expense of a lower or worse filtrate clarity than lower permeability powdered filter media.

The wet bulk density of a powdered filtration medium reflects the void volume or porosity of a filter cake formed from a unit mass of the powdered filtration medium. If two powdered filtration media possess the same particle size exclusion capabilities, but one possesses a lower wet bulk density, the unit consumption of the lower density product, in terms of mass, will also be lower and therefore more cost effective (at equal product pricing). As mentioned above, powdered filtration media made from diatomite provide a greater size exclusion or can remove finer particles from liquids than powdered filtration media made from expanded perlite. Powdered diatomite does not generally contain floaters, as opposed to powdered expanded perlite filtration media, which usually contains floaters. On the other hand, powdered expanded perlite typically has a lower wet bulk density and is more likely to contain low or non-detectable levels of crystalline silica than powdered calcined diatomite. U.S. Pat. Nos. 6,464,770 and 6,712,898 teach methods of making perlite products with reduced floater content and controlled particle size distribution through mechanical classification. An improved filtration media product would ideally contain the best attributes of both diatomite and expanded perlite.

Indeed, composites of diatomite and expanded perlite are known for use as powdered filtration media. U.S. Pat. Nos. 6,524,489 and 5,776,353 teach methods of making composite filtration media from various components including diatomite and expanded perlite with or without a fluxing agent. However, these products have never been commercialized, perhaps due to one or more of the following reasons: the products produced without a fluxing agent have only a relatively low permeability; the products produced with a sodium-based fluxing agent were all produced under conditions that produced measurable levels of cristobalite; the ores used in the examples in the patents all contained approximately three to five percent quartz, which was not removed in the manufacturing process; at the time the prior art was developed, methods to distinguish opal-C and opal-CT from cristobalite did not exist; there is no indication that the inventors of the prior art were able to produce products that possess many of the key properties required for a filter aid to be acceptable in many applications, including soluble impurities and floater content; the most successful flux used in the prior art in suppressing cristobalite formation was boric acid, a very expensive material that substantially increases the soluble aluminum and calcium of the composite filtration media.

A specific formulation of the composites of the prior art was disclosed in a letter to the US Food and Drug Administration (FDA). In this letter, the product is described as containing a very low level of diatomite. Such a product would have little capability to remove fine particles from a liquid because it would behave more like perlite than like diatomite.

Some additional information on the composite prior art is included below. As mentioned above, permeabilities obtained by the prior art without a fluxing agent are too low (about 0.2 darcy) for many commercial applications (see Example 1 of '489 patent, col. 16, line 8). The only examples with sufficiently high permeabilities make use of a fluxing agent, either boric acid or soda ash, or comprise very low amounts of diatomite, which also limits their commercial feasibility (for particle size exclusion reasons). Boric acid and other boron-containing fluxes are expensive and they lead to an increase in soluble calcium and aluminum, which is unacceptable to many producers of filtered liquid products. A sodium-containing fluxing agent such as soda ash may lead to the formation of cristobalite. In addition, as shown in publically available material safety datasheet (Celite MSDS No. 2200, 2012), the diatomite feed material (Celite® 500) disclosed in these patents and used in most examples for making diatomite-perlite composite samples contained up to 4% quartz. Its use in the composite examples disclosed in the patents in a range of 50-90% contributes up to 2 to 4% quartz in the composite products. Furthermore, Example 9 of patent '353 uses a highly flux-calcined diatomite Celite® 560 which contains up to 50% cristobalite (Celite MSDS No. 2410, 2009) in a feed blend with perlite in the 90/10 ratio and the feed blend was calcined with additional 5 wt % soda ash at 1500° F. (816° C.). Thus, one of ordinary skill in the art, understands that the produced composite of patent '353 contains a high level of cristobalite though such high level of cristobalite is not explicitly disclosed in the patent. Further, a publicly disclosed composite product made under these patents included less than 5 wt % diatomite and with sodium flux-calcination, presumably to keep both quartz and cristobalite contents sufficiently low. Composite products containing low levels of diatomite behave, from a particle size exclusion standpoint very much like perlite, in other words, they are not able to remove fine suspended particles from liquids.

As a result, there is a need for an economical, powdered composite filtration media of diatomite and expanded perlite having a wide permeability range, containing very low or non-detectable crystalline silica, low floater content, and low soluble metal content, which can be produced at an attractive cost.

SUMMARY OF THE DISCLOSURE

In one aspect, a powdered composite filtration medium is disclosed. The disclosed powdered composite filtration medium may include composite particles. Each composite particle may include at least one diatomite particle and at least one expanded perlite particle sintered together. The disclosed powdered composite filtration medium may include from about 7 wt % to about 90 wt % diatomite, and from about 93 wt % to about 10 wt % expanded perlite. The disclosed powdered composite filtration medium may have less than about 1 wt % total crystalline silica and may have a permeability of at least 0.25 darcy.

In another aspect, a method for manufacturing a powdered composite filtration medium is disclosed. The disclosed method may include selecting a diatomite powder and an expanded perlite powder for a combined feed and selecting a diatomite content and an expanded perlite content of the combined feed so that the combined feed has a total crystalline silica content of less than 1 wt %. Further, at least one fluxing agent (one or more) may be added to the combined feed or the combined feed may be free of added fluxing agents.

In one embodiment, one or more fluxing agents may be selected from the group consisting of alkali metal carbonates, alkali metal halides, alkali metal silicates and alkali metal borates.

The method may further include sintering the combined feed at a temperature ranging from about 704° C. to about 1038° C. to form the powdered composite filtration medium. The powdered composite filtration medium may include composite particles wherein each composite particle may include at least one expanded perlite particle and at least one diatomite particle sintered together. In an embodiment, the powdered composite filtration medium may contain less than 1 wt % total crystalline silica. In an embodiment, the powdered composite filtration medium may have a permeability of at least 0.25 darcy.

In another aspect, a powdered composite filtration medium is disclosed that may include composite particles. Each composite particle may include at least one diatomite particle and at least one expanded perlite particle sintered together. The powdered composite filtration medium may include from about 7 wt % to about 90 wt % diatomite, and from about 93 wt % to about 10 wt % expanded perlite. The powdered composite filtration medium may have less than about 0.5 wt % total cristobalite and may have less than about 0.5 wt % quartz. In an embodiment, the powdered composite filtration medium may have a permeability of at least 0.25 darcy.

In any one or more of the embodiments described above, the powdered composite filtration medium may include less than about 0.3 wt % boron, preferably less than about 0.2 wt % boron, more preferably less than 0.1 wt % boron.

In any one or more of the embodiments described above, the combined feed (that which is sintered/calcined to form the powdered composite filtration medium) that includes diatomite and expanded perlite may be free of boric acid fluxing agents. Further, there may be less than 0.5 wt % total crystalline silica present in such combined feed.

In any one or more of embodiments described above, the cristobalite content of the powdered composite filtration medium may be less than about 0.5 wt %, more preferably less than about 0.2 wt %, still more preferably less than about 0.1 wt %. Still more preferably, the powdered composite filtration medium may be free of cristobalite (or, in other words, contain a non-detectable amount).

In any one or more of the embodiments described above, the powdered composite filtration medium may contain less than about 0.5 wt % quartz, more preferably less than about 0.2 wt % quartz and still more preferably less than about 0.1 wt % quartz. Still more preferably, in any one or more of the embodiments described above, the powdered composite filtration medium may be free of quartz (or, in other words, contain a non-detectable amount).

In any one or more of the embodiments described above, the powdered composite filtration medium may be free of tridymite (or, in other words, contain a non-detectable amount).

In any one or more of the embodiments described above, the powdered composite filtration medium may contain less than about 0.5 wt % total crystalline silica, more preferably less than about 0.2 wt % total crystalline silica and still more preferably less than about 0.1 wt % total crystalline silica. Still more preferably, in any one or more of the embodiments described above, the powdered composite filtration medium may be free of total crystalline silica (or, in other words, contain a non-detectable amount).

In any one or more of the embodiments described above, the powdered composite filtration medium may have a permeability of greater than about 0.25 darcy, more preferably greater than about 0.4 darcy, still more preferably within the range of from about 0.4 to about 25 darcy, still more preferably within the range of from about 0.4 to about 20 darcy, and still more preferably in the range from about 0.4 to about 10 darcy.

In any one or more of the embodiments described above, the powdered composite filtration medium made without a fluxing agent may have a permeability of greater than about 0.25 darcy, more preferably greater than about 0.4 darcy, and still more preferably within the range of from about 0.4 to about 5 darcy.

In any one or more of the embodiments described above, the EBC soluble arsenic content may be less than about 5 ppm, more preferably less than about 1 ppm. Similarly, in any one or more of the embodiments described above, the EBC soluble aluminum content may be less than about 180 ppm, more preferably less than about 100 ppm. In any one or more of the embodiments described above, the EBC soluble calcium content may be less than about 500 ppm, more preferably less than about 300 ppm. In any one or more of the embodiments described above, the EBC soluble iron content of the powdered composite filtration medium may be less than about 80 ppm, more preferably less than about 60 ppm. In any one or more of the embodiments described above, the EBC soluble boron content of the powdered composite filtration medium may be less than about 150 ppm.

In any one or more of the embodiments described above, the total floater content of the powdered composite filtration medium may be less than about 1 ml/g, more preferably less than about 0.6 ml/g, still more preferably less than 0.4 ml/g and still more preferably less than 0.1 ml/g. And, in any one or more of the embodiments described above, the persistent floater content may be less than about 0.5 ml/g, more preferably less than about 0.3 ml/g, still more preferably less than about 0.2 ml/g, and still more preferably less than about 0.1 ml/g.

In any one or more of the embodiments described above, the powdered composite filtration medium may be made using a sintering temperature or calcination temperature ranging from about 704° C. to about 1038° C.

In any one or more of the embodiments described above, the diatomite powder used for the feed may contain less than about 0.5 wt % crystalline silica, more preferably less than about 0.2 wt % crystalline silica, still more preferably less than about 0.1 wt % crystalline silica, and still more preferably no-detectable amount of crystalline silica.

In any one or more of the embodiments described above, the crystalline silica content in the diatomite powder may be reduced by beneficiation. The crystalline silica content in the diatomite powder may be reduced by beneficiation prior to sintering/calcination. In any one or more of the embodiments described above, the crystalline silica content in the expanded perlite powder used for the feed may be reduced by beneficiation. The crystalline silica content in the expanded perlite powder used for the feed may be reduced by beneficiation prior to sintering/calcination.

In any one or more of the embodiments described above, the expanded perlite powder used for the feed may contain less than about 0.5 wt % crystalline silica, more preferably less than about 0.2 wt % crystalline silica, still more preferably less than about 0.1 wt % crystalline silica, and still more preferably no-detectable amount of crystalline silica.

In any one or more of the embodiments described above, the diatomite powder or the expanded perlite powder used for the feed may be pretreated either mechanically, chemically or a combination thereof to reduce mineral and chemical impurities.

In any one or more of the embodiments described above, a fluxing agent may be added to the combined feed prior to sintering/calcination. In one embodiment, the fluxing agent may be a salt of an alkali metal. For example, the fluxing agent may be an alkali metal halide, alkali metal carbonate, alkali metal silicate or alkali metal borate. In any one or more of the embodiments described above, the fluxing agent may be used in a range of from about 0.1 wt % to about 10 wt % of the combined feed. In some embodiments, the combined feed may include a plurality of (added) fluxing agents. The plurality of fluxing agents may include salts of alkali metals, with the amount of the plurality of the fluxing agents, in aggregate, in a range of from about 0.1 wt % to about 10 wt % of the combined feed. For example, in an embodiment, one or more of the fluxing agent(s) may be an alkali metal halide, alkali metal carbonate, alkali metal silicate or alkali metal borate.

In any one or more of the embodiments described above, the feed blend that includes powdered diatomite and powdered expanded perlite may be pre-agglomerated with a liquid, which may be water and wherein wet pre-agglomerates may be formed by spray drying.

In any one or more of the embodiments described above, the powdered composite filtration medium may be acid washed to reduce the soluble substance content thereof.

In any one or more of the embodiments described, at least one adsorptive agent may be used, and said adsorptive agent may be silica gel, precipitated silica, fumed silica, activated carbon, activated alumina, natural zeolite, synthetic zeolite, or a bleaching clay (for example, activated bleach clay). Such an adsorptive agent may be incorporated by surface growing, precipitation from a solvent, thermal sintering, the use of a binding agent or combinations of the above. If alumina is used as the adsorptive agent, it may be incorporated into the composite by converting aluminum tri-hydroxide to activated alumina by heating and thermally sintering. In some embodiments, the powdered composite filtration medium may further comprise one or more adsorbents selected from the group consisting of silica gel, precipitated silica, fumed silica, activated alumina, activated bleach clay, natural zeolite, synthetic zeolite and activated carbon. In such an embodiment, each adsorbent is intimately bound to the composite particles of the powdered composite filtration medium.

In any one or more of the embodiments described above, the powdered composite filtration medium may be used in liquid-solid separation, liquid-liquid separation, air-solid separation, as a filterable adsorbent or as an adsorptive filter aid.

In any one or all of the compositions discussed above, the product may contain one or more phases of opaline silica, such as opal-A, opal-CT and opal-C, but no detectable levels of cristobalite.

Also disclosed is a filter sheet comprising any one of the powdered composite filtration mediums discussed above. A filter sheet is known in the art to remove particles from liquids or gases. In an embodiment, the filter sheet may include a matrix of cellulosic or polymer fiber (or the like) enriched with the powdered composite filtration medium.

Some of the powdered composite filtration mediums discussed above may be used to clarify a liquid or may be used in other liquid processing operations, for example blood plasma fractionation.

The powdered composite filtration medium may be regenerated, after use, by one or more physical, chemical or thermal regeneration processes. In one embodiment, the process for regenerating the used powdered composite filtration medium (following use in a liquid processing application) does not result in a measurable conversion of opaline silica phases (contained in the used powdered composite filtration medium) to a form of crystalline silica. In other words, the regenerating does not increase the total crystalline silica wt % present in the regenerated used powdered composite filtration medium over the amount of total crystalline silica wt % present in the used powdered composite filtration medium before such regeneration. In an embodiment, the regenerating does not increase the total cristobalite wt % or the quartz wt % present in the regenerated used powdered composite filtration medium over the amount of the total cristobalite wt % or the quartz wt % present in the used powdered composite filtration medium before such regeneration.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and filtration media, reference should be made to the embodiments illustrated in greater detail on the accompanying drawings, wherein.

DETAILED DESCRIPTION

Figure 1:
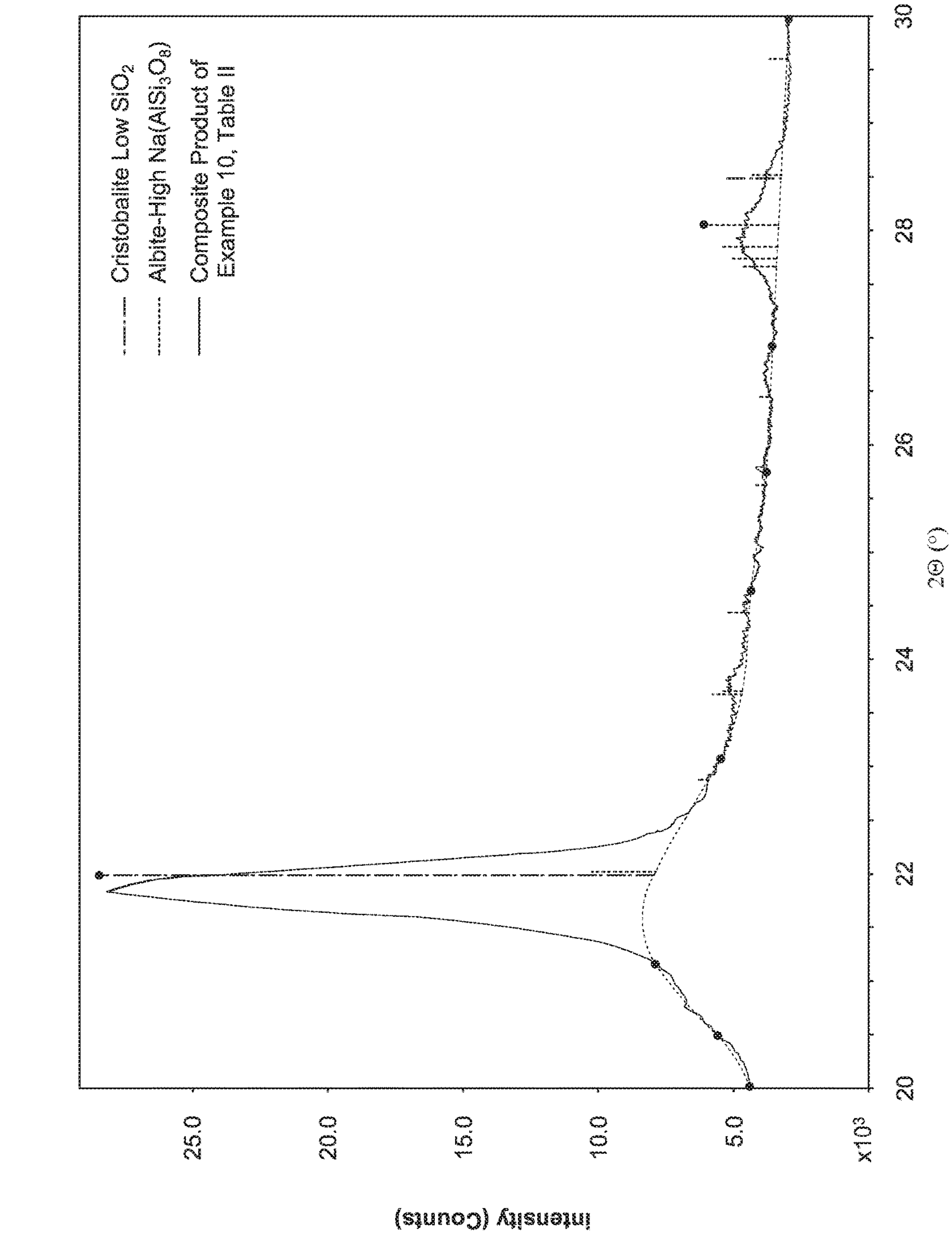
FIG. 1 shows the x-ray diffraction pattern of composite product of Example 10, Table II, overlaying with line patterns of cristobalite and albite.

In the examples of this disclosure, feed materials used for making powdered diatomite/expanded perlite composite filtration media include diatomite from ores mined in Nevada and Oregon and expanded perlite products available from EP Minerals (Celatom® CP-600P, CP-1400P and CP-4000P), which were obtained from ores mined in northern Nevada. Table I shows the major element compositions of the diatomite feed materials as analyzed by the x-ray fluorescence (XRF) method and normalized to the ignited basis. Also included in Table I are the loss of ignition (LOI) results and the quartz contents by the x-ray diffraction (XRD) method. Each feed diatomite contained 0.2 wt % or less quartz. XRD scans of the diatomite feed materials show non-detectable level of cristobalite and also show the presence of a small amount of feldspars. The major element compositions of the three expanded perlite products are also listed in Table I. Among the diatomite feed materials, Diatomite A, A1 and B were all of so-called "natural". i.e., uncalcined. Among those, Diatomite A1 was prepared from Diatomite A by wet gravity separation to remove a portion of heavier particles at a yield of 84 wt %. Diatomite C was a flux-calcined diatomite containing no cristobalite but 21.5 wt % opal-C. Samples of the expanded perlite products used in this disclosure. Celatom® CP-600P. CP-1400P and CP-4000P, had permeabilities of 0.84, 1.9 and 2.7 darcy and wet bulk densities of 12.7, 9.1 and 8.2 lbs/ft$^3$ (0.20, 0.15 and 0.13 g/cm$^3$), respectively. Any fluxing agents used were all milled and passed through a 325-mesh sieve. The boron content in selected feed materials (Table I) was analyzed by dissolving a powder sample in a mixture of hydrofluoric acid (HF) and nitric acid ($HNO_3$) and analyzing by the inductively-coupled plasma optical emission spectroscopy (ICP-OES).

TABLE I

Compositions of Diatomite and Perlite Feed Materials

| Sample | $SiO_2$ wt % | $Al_2O_3$ wt % | CaO wt % | MgO wt % | $Na_2O$ wt % | $K_2O$ wt % | $Fe_2O_3$ wt % | As ppm | S ppm | B ppm | LOI wt % | Qz[1] wt % | Crist[2] wt % | TCS[3] wt % | Opal C/CT wt % |
|---|---|---|---|---|---|---|---|---|---|---|---|---|---|---|---|
| DE A | 92.7 | 3.2 | 0.87 | 0.35 | 0.46 | 0.36 | 1.73 | 14 | 123 | 66 | 7.4 | 0.15 | ND | 0.15 | ND |
| DE A1 | 94.1 | 2.7 | 0.65 | 0.32 | 0.32 | 0.22 | 1.51 | 10 | 59 | N/A | 5.4 | <0.1 | ND | <0.1 | ND |
| DE B | 87.4 | 6.9 | 0.95 | 0.64 | 0.30 | 0.21 | 3.05 | 12 | 157 | N/A | 4.7 | 0.2 | ND | 0.2 | ND |
| DE C | 88.3 | 4.8 | 0.5 | 0.3 | 2.5 | 0.2 | 2.9 | 6 | 117 | N/A | 0.1 | <0.1 | ND | <0.1 | 21.5 |
| Perlite | 76.1 | 13.4 | 0.64 | 0.13 | 4.3 | 4.5 | 0.59 | 20 | 6 | 49 | ND | <0.1 | ND | <0.1 | ND |

DE—Diatomite;
N/A—Not analyzed;
[1]Quartz;
[2]Cristobalite;
[3]Total crystalline silica;
ND—non-detectable.

Calcination or sintering took place in an electrical muffle furnace. Each feed was prepared by mixing a diatomite (powder) and an expanded perlite (powder), according to the desired feed ratio, with or without a fluxing agent, in a plastic container placed in a paint shaker. The mixed feed was calcined at the desired temperature (for example, between about 704° C. to about 1038° C.) for about 30 to about 40 minutes in a ceramic crucible. The calcined product, upon cooling to ambient temperature, was dispersed by sifting through 40- and 70-mesh sieves and shaking with several small ceramic balls. In the cases of high-permeability composite samples made from Diatomite C, the dispersion was done by hand brushing through a 30-mesh sieve. The dispersed product (powdered composite filtration medium) comprises composite particles, each composite particle including at least one diatomite particle and at least one expanded perlite particle sintered together. In an embodiment, the product may contain opaline biogenic silica (e.g., opal-A, opal-CT or opal-C) intimately and directly bound to expanded perlite (wherein the opaline biogenic silica and the particles of expanded perlite are a coherent mass (i.e., are intimately bound)). The dispersed product was analyzed for permeability and wet bulk density (WBD), crystallinity by XRD scan, floater content, and for soluble metal contents according to the methods to be described below. As mentioned above, the inventors made use of the method of Lenz, et al. in distinguishing between the opal-CT/opal-C and cristobalite contents of the samples.

As disclosed in Lenz et al., to determine whether a diatomite sample contains cristobalite or opal-C/CT involves a number of steps. First, a determination is made as to whether the sample contains water of hydration via high temperature loss on ignition (LOI) testing. Opals always contain some water existing as internal or attached silane groups, while cristobalite is anhydrous. Thus, the sample (or a portion of the sample) may be analyzed for the presence of residual hydration water (and the potential presence of opaline silica) by an LOI test. During the LOI test, the sample (or portion of) is calcined at a high temperature (for example, 982° C., 1000° C., or the like) for a sufficient time (at least 1 hour) so that chemically-bound water has a chance to disassociate and volatilize. Precise measurement of the tested sample mass (or tested portion mass) before and after this treatment allows quantification of the water of hydration. Tested samples that are determined to have contained over 0.1% residual hydration water via the LOI test have the potential to contain opal-C/CT.

Second, bulk powder x-ray diffraction is performed on composite samples, and the resulting diffraction pattern is used to detect the potential presence of quartz, cristobalite and opaline silica of opal-C and opal-CT phases. All of the bulk powder XRD work detailed herein was performed using a Siemens D5000 diffractometer controlled with MDI Datascan5 software, with CuKα radiation (λ=1.54056 Å), sample spinning, graphite monochromator, and scintillation detector. Power settings were at 50 KV and 36 mA, with step size at 0.04° and 4 seconds per step. JADE (2010) software was used for analyses of XRD scans. Sample preparation included SPEX® milling in zirconia vials. Selected samples showing a detectable peak near 22° 2θ are examined against the full pattern of cristobalite to determine whether it is cristobalite or opaline silica of opal-C or CT based on the peak centroid location and FWHM and the development of secondary peaks, especially the peak near 28.5° 2θ. Differentiation between opal-C and opal-CT is not attempted in this disclosure due to the low concentrations in the products of this disclosure and transitional natural of these two phases. When the following conditions are all met the phase presented by the 22° 2θ peak (4-Å phase) is determined as opal-C/CT: a) calculated d-spacing from 220 2θ peak centroid location (according to Bragg law, λ=2d sin θ) is 4.05 Å or higher, b) FWHM of the 22° 2θ peak is higher than 0.2° 2θ, and c) peak(s) near 28.50 and 31.50 2θ are missing or poorly developed. Lower d-spacing, lower FWHM and well developed cristobalite secondary peaks are indicators of potential presence of cristobalite.

If the pattern is obviously indicative of opal-C (or opal-CT), then further analysis is not required. If the diffraction pattern is questionable, then a second XRD analysis is needed, this time on a split of the sample with a known amount of cristobalite standard reference material (i.e. National Institute of Standards and Technology (NIST) Standard Reference Material 1879A) added to it (a "spiked sample"). To confirm the absence of cristobalite within the spiked sample, an XRD analysis is run on the spiked sample. The original un-spiked sample diffraction pattern is compared with the spiked sample pattern. If the spiked sample pattern simply increases the intensity of the primary and secondary peaks but does not show a position shift or show additional peaks, then the original sample most likely contains cristobalite. If the primary peak shifts and becomes sharper (or resolves into two separate peaks), and secondary peaks appear or become much better defined, then opal-C/CT, and not cristobalite, is present in the original sample. As described above, the cristobalite spike significantly modifies the diffraction pattern if the sample comprises opal-C/CT but only results in increased peak intensity if the sample comprises cristobalite.

It has been demonstrated that calcination of the expanded perlite materials used to produce the samples disclosed in this patent application, with or without a fluxing agent, does not form any phase with an x-ray diffraction peak near 22° 2θ or 4-Å phase. The formation of the 22° 2θ peaks in a diatomite-perlite composite relates to the presence of diatomite. Factors promoting the 4-Å phase formation in the composite filter media are diatomite to perlite ratio, fluxing agent and dosage and calcination temperature. Products produced under the combinations of extreme conditions (highest diatomite to perlite ratios, highest dosages of fluxing agent and highest calcination temperatures) have shown highest contents of 4-Å phases among the respective groups of similar formulation. These products are selected for detailed XRD pattern analysis to determine the nature of the 4-Å phases. A determination confirming the presence of opal-C/CT and excluding cristobalite is also applied to other composite samples made with the same or lower diatomite-to-perlite ratios with the same fluxing agent of the same or lower dosages at the same or lower temperatures.

To quantify the opal-C/CT content of a diatomite sample can be complicated as its diffraction pattern is a combination of broad peaks and amorphous background, and diatomite products often contain other x-ray amorphous phases in addition to opal. After either cristobalite or opal-C/CT is identified for a sample, the respective quantification is determined from the area of the near 22° 2θ peak of the XRD scan, based on calibration by cristobalite standard reference material (NIST 1879A) in a natural diatomite (opal-A) matrix. For opal-C/CT, it may not be the exact mass quantification but an equivalent mass concentration referenced to cristobalite. An estimate of the quantity can be obtained by treating the opal-C/CT peaks of the XRD scan as if they are cristobalite and quantifying against the cristobalite standards. This method, called the XRD Method in Lenz et al., will usually underestimate the opal-C/CT content but is effective for a number of purposes, such as manufacturing quality control. A more exact measure can be obtained by heating the sample at very high temperature (1050° C.) for an extended period (24 hours). This converts opaline phases to cristobalite (reduces amorphous background component), and then the cristobalite can be quantified against the standards to give a more absolute estimate of original opal-C/CT content.

In addition, it is well known that feldspars have secondary peaks in their XRD scan patterns that are very close to the 22.02° 2θ primary peak of cristobalite, which interferes with cristobalite or opal-C/CT quantification. For diatomite products made from an ore containing a small amount of feldspars, this interference becomes significant when the nominal content of cristobalite or opal-C/CT is low, i.e., <1 wt %. To correct for this interference, a diatomite used in composite preparation was also used to prepare a blank sample with no cristobalite (~0 wt %) and a 0.1 wt % cristobalite standard sample. Multiple XRD scans were performed on the blank and standard samples. Using the XRD scan patterns of the blank sample, the x-ray diffraction counts in both primary ($N_{fp-b}$) and secondary peaks ($N_{fs-b}$) of feldspars were taken from which a count ratio between the peaks are calculated ($R=N_{fs-b}/N_{fp-b}$). An average ratio ($R_{avg}$) is produced from multiple scans of the same blank sample. This is easily done without interference from cristobalite, which is absent in the blank sample. From the XRD scans on the standard sample (0.1 wt % cristobalite), the counts at both the primary peak for feldspars ($N_{fp-std}$) and the overlapping primary peak for cristobalite/secondary peak for feldspars ($N_{overlap-std}$) were collected. Because the average ratio for feldspars ($R_{avg}$) applies to both the blank and standard samples, the counts at the secondary peak ($N_{fs-std}$) for feldspars in the standard sample contributing to the overlapping peak may be calculated by multiplying the average ratio ($R_{avg}$) by the primary counts ($N_{fp-std}$) for feldspars in the standard sample ($N_{fs-std}=R_{avg}\cdot N_{fp-std}$). The net cristobalite primary counts ($N_{cp-std}$) in the standard sample are calculated by deducting those attributable to the secondary counts of the feldspars ($N_{fs-std}$) in the standard sample from the total counts for the overlapping primary cristobalite peak/secondary feldspar peak ($N_{cp-std}=N_{overlap-std}-N_{fs-std}$). Thus, average ratio ($R_{avg}$) can be used to calculate the corrected or net cristobalite or opal-C/CT content of the composite samples from the XRD scans:

$$C_{sample}\text{ wt }\%=C_{std}(\text{wt }\%)\cdot(N_{overlap-sample}-R_{avg}\cdot N_{fp-sample})/N_{cp-std}$$

or, $$C_{sample}\text{ wt }\%=C_{std}(\text{wt }\%)\cdot(N_{overlap-sample}-R_{avg}\cdot N_{fp-sample})/(N_{overlap-std}-R_{avg}\cdot N_{fp-std})$$

In this disclosure, the permeabilities of the powdered filtration media disclosed below were determined using an automated permeability meter developed by EP Minerals and described in principle in U.S. Pat. No. 5,878,374. The wet bulk densities of powdered filtration media disclosed below were determined at the same time as permeability during the permeability meter as described above.

In this disclosure, the EBC extraction method for soluble iron is used to determine the contents of soluble substances including, in addition to iron, calcium, aluminum, arsenic, and boron and the solubility of each substance is described as EBC soluble iron, calcium, aluminum, arsenic, and boron, respectively. The EBC soluble metal test consists of suspending a sample (2.5% slurry concentration) for two hours at ambient temperature in a 1% solution of potassium hydrogen phthalate (pH of 4), filtering the suspension, and then analyzing the filtrate for metal contents using the atomic absorption (AA) or the inductively-coupled plasma (ICP) spectrophotometers. In this disclosure, the extracted arsenic was analyzed by the graphite furnace atomic absorption spectroscopy (GFAA) and iron, calcium, aluminum and boron by the inductively-coupled plasma optical emission spectroscopy (ICP-OES).

In this disclosure, the floater content of an expanded perlite or a composite of diatomite and expanded perlite is expressed in two ways: volume fraction or volume per unit mass of a powder. A 5-g powder sample may be mixed in 250-ml water in a 250-ml graduated cylinder by inverting several times, followed by standing to allow floaters to rise to water surface and non-floaters to settle to the bottom of the cylinder. After sixty minutes, the volumes of both floaters and the "sinkers" are read from the graduation, and the "total floater" volume fraction is calculated from the floater volume divided by the total volume of floaters and sinkers. Then, the floater layer is gently stirred and the graduated cylinder is let stand for another 30 minutes. A second set of floater and sinker volumes are read from the graduation, from which a second floater volume fraction is calculated. Those initial floaters that fall or drop to the bottom after a gentle stirring are weak floaters, meaning that these are not fully sealed perlite bubbles and can be easily incorporated into slurry with mild agitation. The remaining floaters are "persistent" floaters, which are harder to incorporate into a slurry, may accumulate in process vessels and may not participate in the filtration process.

EXAMPLES

Examples of composite filter media made under various conditions according to this disclosure are listed in the Tables II to XI, and Tables XIII to XIV. All the products contain less than 0.1 wt % or no-detectable amount of quartz. Products made under combined high levels of diatomite-to-perlite ratios, dosages of fluxing agents and calcination temperatures were selected for detailed XRD pattern analysis, and the results are listed in Table II. The XRD pattern of the product of Example 10, showing the most pronounced 22° 2θ peak among the composite samples listed in Tables II to VII, is presented in FIG. 1 to demonstrate the shift of the peak centroid. It should be noted that feldspars have diffraction peaks around 27-28° 2θ which can interfere with the 28.5° 2θ peak of cristobalite and opal-C.

TABLE II

XRD Analysis on Selected Composite Samples

| | | Fluxing agent | | Temp. | 22° 2θ Peak | | 28.5° | LOI | 4-Å phase | |
|---|---|---|---|---|---|---|---|---|---|---|
| | | | | | d | FWHM | 2θ | | | |
| Ex. No. | DE* wt % | Type | wt % | ° C. | Å | ° 2θ | Peak | wt % | Phase | wt % |
| 74 | 75 | None | 0 | 982 | 4.08 | 0.33 | no | 0.43 | Opal-C/CT | <0.1 |
| 48 | 50 | $Na_2CO_3$ | 1.0 | 982 | 4.06 | 0.30 | no | 0.80 | Opal-C/CT | 0.5 |
| 21 | 50 | $Na_2CO_3$ | 2.0 | 927 | 4.03 | 0.34 | poor | 1.1 | Cristobalite | 1.2 |
| 29 | 25 | $Na_2CO_3$ | 2.0 | 927 | 4.05 | 0.29 | poor | 1.2 | Opal-C/CT | 0.5 |
| 10 | 75 | $Na_2CO_3$ | 5.0 | 871 | 4.06 | 0.42 | poor | 0.17 | Opal-C/CT | 17.5 |
| 13 | 50 | $Na_2CO_3$ | 5.0 | 871 | 4.06 | 0.40 | poor | 0.19 | Opal-C/CT | 13.3 |
| 16 | 25 | $Na_2CO_3$ | 5.0 | 871 | 4.08 | 0.40 | poor | 0.29 | Opal-C/CT | 5.8 |
| 38 | 50 | $Na_2CO_3$ | 7.0 | 760 | 4.02 | 0.35 | poor | 0.63 | Cristobalite | 2.9 |
| 37 | 50 | $Na_2CO_3$ | 7.0 | 704 | 4.06 | 0.31 | poor | 1.2 | Opal-C/CT | 2.3 |
| 41 | 25 | $Na_2CO_3$ | 7.0 | 760 | 4.06 | 0.34 | no | 0.64 | Opal-C/CT | 1.3 |
| 1 | 50 | $H_3BO_3$ | 3.0 | 816 | 4.06 | 0.29 | no | 0.99 | Opal-C/CT | 0.1 |
| 76 | 50 | $K_2CO_3$ | 5.0 | 816 | 4.05 | 0.33 | no | 1.4 | Opal-C/CT | 1.2 |
| 79 | 50 | $K_2SiO_3$ | 5.0 | 816 | 4.06 | 0.29 | poor | 1.5 | Opal-C/CT | 1.3 |
| 82 | 25 | $K_2SiO_3$ | 6.8 | 816 | 4.06 | 0.27 | poor | 1.2 | Opal-C/CT | 1.4 |

*Percent of diatomite in the feed blend of diatomite and perlite, excluding fluxing agent, if any, the same below.

Example 74 demonstrates a composite filter medium made with 75 wt % diatomite without using a fluxing agent by calcination at a temperature of about 982° C. Analysis on the XRD scan pattern of the product shows that the weak near 22° 2θ peak has a 4.08 Å peak centroid and 0.33° 2θ FWHM and the 28.5° 2θ peak of cristobalite is missing (Table II). Combination of all these indicates the presence of opal-C/CT instead of cristobalite. Therefore, the product contains no cristobalite and is determined to have less than 0.1 wt % opal-C/CT. Composite filter media made with less content of diatomite of similar properties without the use of a fluxing agent at the same or lower temperature should contain no cristobalite and less than about 0.1 wt % or no opal-C/CT.

Example 48 presents a composite filter medium made with 50 wt % diatomite and 1 wt % soda ash fluxing agent by calcination at 982° C. Analysis on its XRD scan pattern produces a centroid of 4.06 Å and 0.30° 2θ FWHM for the 22° 2θ peak and the 28.5° 2θ peak of cristobalite is absent (Table II). Therefore the product contains no cristobalite, and about 0.5 wt % opal-C/CT is determined.

Examples 21 and 29 present composite filter media made with 50 or 25 wt % diatomite and 2 wt % soda ash dosage and calcination at 927° C. XRD scan patterns for both samples show wide FWHMs for the 22° 2θ peaks and poor near 28.5° 2θ peaks (Table II). However, Example 21, made with 50 wt % diatomite, has a centroid of 4.03 Å, and that of Example 29, made with 25 wt % diatomite, is 4.05 Å. Therefore the former is determined to contain 1.2 wt % cristobalite and latter 0.6 wt % opal-C/CT.

Higher soda ash dosages may lead to higher amounts of 4-Å phase formation, however they may not necessarily be cristobalite. In Examples 10, 13 and 16, composites of 75, 50 and 25 wt % diatomite were made with 5 wt % soda ash and calcination at 871° C. Analysis on their XRD scan patterns show high 22° 2θ peak centroids (4.06-4.08 Å), high FWHMs (0.40-0.42° 2θ) and poorly developed 28.5° 2θ peaks (Table II). FIG. 1 presents the XRD diffraction pattern of the composite product of Example 10 which demonstrates the significant shift of its 22° 2θ peak towards a lower 2θ angle from that of cristobalite. Cristobalite is determined to be absent in these products, and the content of opal-C is determined to be 17.5, 13.3 and 5.8 wt %, respectively.

Examples 37, 38 and 41 in Table II are composite media made with 7 wt % soda ash with 25 or 50 wt % diatomite calcined at temperatures of 704 or 760° C. Example 38 demonstrates that the combination of 50 wt % diatomite, 7 wt % soda ash and 1400° F. (760° C.) temperature produced a composite product containing 2.9 wt % cristobalite. However, either a lower temperature (Example 37) or a lower content of diatomite in feed (Example 41) produced a composite containing about 2.3 or 1.3 wt % opal-C/CT and cristobalite was absent.

Selected composite filter media samples made with other fluxing agents were also analyzed for their silica crystallinity. Example 1 presents a composite medium made with 50 wt % diatomite and 3 wt % boric acid ($H_3BO_3$) and calcination at 816° C. Analysis on its XRD scan pattern produces a 22° 2θ peak centroid of 4.06 Å and an FWHM of 0.29° 2θ and an absent 28.5° 2θ peak (Table II). These lead to a determination of about 0.1 wt % opal-C/CT in the product and cristobalite is absent.

Examples 76 and 79 present composite media made with 50 wt % diatomite and 5 wt % potassium carbonate ($K_2CO_3$) or potassium silicate ($K_2SiO_3$), respectively, by calcination at 816° C. Analysis on their XRD scan patterns produce 22° 2θ peak centroids of 4.05 and 4.06 Å and FWHMs of 0.33 and 0.29° 2θ, respectively, and the 28.5° 2θ peaks are either absent or poorly developed (Table II). These lead to a determination of opal-C/CT instead of cristobalite in the products at levels of about 1.2 and 1.3 wt %, respectively. Example 82 presents a composite made with a feed of 25 wt % diatomite and 6.8 wt % potassium silicate by calcination at 816° C. It is analyzed to contain 1.4 wt % opal-C/CT according to its XRD scan pattern (Table II).

Composite filtration media made with diatomite and perlite using boron fluxing agents are shown in Table III. The product of Example 1 contains the highest (0.1 wt %) 4-Å phase which is determined as opal-C/CT (Table II). Therefore, this group of composite filter media contains no detectable amount of crystalline silica and about 0.1 wt % opal-C/CT or less. Referring to Examples 1-2, using a Diatomite A to CP-1400P perlite weight ratio of 50/50, 3-5 wt % boric acid and calcination at 816° C. the products had permeabilities of 0.85-1.4 darcy and WBDs of 0.20-0.22 g/cm$^3$. Referring to Examples 5-7, by using a coarser perlite, CP-4000P, at 50-75 wt % (corresponding diatomite content at 50-25 wt %), 5-7 wt % boric acid and with a lower calcination temperature of 760° C., composites of 1.2-4.0 darcy were made. In Examples 3-4, non-crystalline silica diatomite-perlite composite filtration media were made using borax or sodium borate ($Na_2B_4O_7 \cdot 10H_2O$) as the fluxing agent. Prepared with a weight ratio of Diatomite A to CP-1400P perlite of 50/50, 3-5.6 wt % borax and calcination at 816° C., the products had permeabilities of 0.84-2.2 darcy and WBDs of 0.19-0.22 g/cm$^3$. It is worth noting that borax is different from boric acid in the presence of sodium ions and the use of this sodium fluxing agent does not lead to the formation of cristobalite in a diatomite-perlite composite under the conditions of this disclosure. As shown by Examples 1-7 (Table III), the use of boron-containing fluxes leads to an increase in the soluble aluminum (Al) and calcium (Ca) content of the composites. The high levels of aluminum and calcium shown in Table III render the products of Examples 1-7 as unacceptable in some filtration applications.

TABLE III

Examples of Composites Made with Diatomite A and Boron Fluxing Agents

| Ex. No. | DE wt % | Flux wt % | Temp. ° C. | Perm. darcy | WBD g/cm$^3$ | Opal-C/CT wt % | EBC Solubility, ppm As | Al | Ca | Fe |
|---|---|---|---|---|---|---|---|---|---|---|
| CP-1400P and boric acid | | | | | | | | | | |
| 1 | 50 | 3.0 | 816 | 0.85 | 0.22 | 0.1 | 1.2 | 137 | 675 | 45 |
| 2 | 50 | 5.0 | 816 | 1.4 | 0.20 | <0.1 | 1.1 | 122 | 620 | 39 |
| CP-1400P and borax | | | | | | | | | | |
| 3 | 50 | 3.0 | 816 | 0.84 | 0.22 | <0.1 | 1.6 | 130 | 652 | 73 |
| 4 | 50 | 5.6 | 816 | 2.2 | 0.19 | <0.1 | 1.7 | 96 | 613 | 86 |
| CP-4000P and boric acid | | | | | | | | | | |
| 5 | 25 | 7.0 | 760 | 4.0 | 0.14 | <0.1 | 0.4 | 244 | 406 | 64 |
| 6 | 50 | 5.0 | 760 | 1.2 | 0.17 | <0.1 | 0.7 | 271 | 866 | 91 |
| 7 | 25 | 5.0 | 760 | 2.5 | 0.14 | <0.1 | 0.4 | 230 | 450 | 109 |

Listed in Table IV are examples of composites made from Diatomite A and expanded perlite CP-1400P in weight ratios of 25/75 to 75/25 with soda ash as the fluxing agent. The products have permeabilities from 0.2 to 2.8 darcy and wet bulk densities of 0.19 to 0.75 g/cm$^3$. As an important property of powdered filtration media, wet bulk density of a composite of certain diatomite-to-perlite ratio is significantly impacted by soda ash dosage and temperature. An over-calcined product is demonstrated by a high wet bulk density which reflects a low porosity and poor filtration performance. A lower diatomite-to-perlite feed blend tends to soften more easily and be over-calcined at a lower temperature and/or with a lower dosage of soda ash. This is also demonstrated by the permeabilities of the composites of certain formulations which increase and then decrease with an increasing calcination temperature (see Examples 31-34). Without being bound by theory, it is believed that the reversal of the permeability trend reflects an over-softening of the expanded perlite at higher temperatures and is accompanied by a dramatic increase in wet bulk density (see Example 34). The over-calcination and the resulting increase in product density are generally undesired for powdered filtration media.

The composite products listed in Table IV contain no detectable level of quartz and most of the samples contain no detectable level of cristobalite. The only exception is Example 21 in which a feed of 50/50 diatomite-to-perlite weight ratio was calcined with 2% soda ash at 927° C. and contained 1.2 wt % cristobalite. The other products made at lower temperatures or at the same temperature but with a lower soda ash dosage and/or a lower diatomite-to-perlite weight ratio contain no cristobalite. In general, at the same soda ash dosage, the opal-C/CT content drops with increasing perlite content but increases with increasing calcination temperature.

Examples 17-35 of Table IV demonstrate that diatomite-perlite composites may be made with a lower dosage of soda ash, but a higher calcination temperature is needed for a suitable permeability. The contents of opal-C/CT in these lower soda ash composites are also generally lower than those of higher soda ash dosages but similar permeability. For instance, from a feed consisting of Diatomite A and CP-1400P in the weight ratio of 25/75, Example 28 is a composite of 1.8 darcy and 0.7 wt % opal-C/CT made with 2 wt % soda ash and calcination at 871° C. Example 33 is a composite of 1.6 darcy and 0.3 wt % opal-C/CT made with 1 wt % soda ash and calcination at 927° C. Examples 28 and 33 may be compared to Example 15, which is a 1.4 darcy composite containing 1.4 wt % opal-C/CT and was made from the same feed blend with 5 wt % soda ash and calcination at 816° C.

Examples 36-50 of Table V are composites made from Diatomite A and CP-4000P perlite in weight ratios ranging from 50/50 to 5/95, with 1 wt % to 7 wt % soda ash and calcined at temperatures ranging from 704-982° C. The resulting products had permeabilities of about 0.7-4.8 darcy and contained from less than 0.1 wt % to 2.9 wt % 4-Å phase, among which only the product made with 50 wt % diatomite with 7 wt % soda ash and calcined at 760° C. contained cristobalite. Less diatomite and/or less soda ash in the feed blend in combination with a lower calcination temperature prevent the formation of cristobalite and led to lower opal-C/CT formation. Example 39 is a composite made from Diatomite A and CP-4000P, in a weight ratio of 25/75 and 5 wt % soda ash, calcined at 760° C. and having a permeability of 3.9 darcy and 1.2 wt % opal-C/CT. Alternatively, similar permeability composites having lower opal-C/CT content may be made from a feed blend of less diatomite, a lower soda ash dosage but calcined at a higher temperature. Example 47 is a composite made from a feed of 5/95 weight ratio of Diatomite A and CP-4000P, 1 wt % soda ash, calcined at 927° C. and exhibits a permeability of 3.9 darcy and <0.1 wt % opal-C/CT.

TABLE IV

Examples of Composites Made from Diatomite A, CP-1400P and Soda Ash

| Ex. No. | DE wt % | Soda ash wt % | Temp. ° C. | Perm. darcy | WBD g/cm$^3$ | Cristobalite wt % | Opal-C/CT wt % | EBC Solubility, ppm As | Al | Ca | Fe |
|---|---|---|---|---|---|---|---|---|---|---|---|
| 8 | 75 | 5.0 | 760 | 0.51 | 0.27 | | 3.1 | 1.8 | 231 | 730 | 99 |
| 9 | 75 | 5.0 | 816 | 0.78 | 0.28 | | 5.2 | 1.5 | 71 | 668 | 50 |
| 10 | 75 | 5.0 | 871 | 1.3 | 0.30 | | 17.5 | 2.3 | 43 | 545 | 71 |
| 11 | 50 | 5.0 | 760 | 1.4 | 0.21 | | 2.0 | 1.1 | 156 | 532 | 61 |
| 12 | 50 | 5.0 | 816 | 1.8 | 0.26 | | 3.9 | 0.9 | 52 | 483 | 34 |
| 13 | 50 | 5.0 | 871 | 1.4 | 0.38 | | 13.3 | 1.1 | 32 | 370 | 37 |
| 14 | 25 | 5.0 | 760 | 2.8 | 0.19 | | 1.2 | 0.4 | 99 | 323 | 39 |
| 15 | 25 | 5.0 | 816 | 1.4 | 0.35 | | 1.4 | 0.8 | 44 | 267 | 23 |
| 16 | 25 | 5.0 | 871 | 0.20 | 0.75 | | 5.8 | 0.7 | 37 | 210 | 34 |
| 17 | 50 | 3.0 | 760 | 0.67 | 0.23 | | 1.5 | 1.5 | 285 | 628 | 183 |
| 18 | 50 | 3.0 | 816 | 0.96 | 0.22 | | 1.4 | 1.3 | 84 | 491 | 106 |
| 19 | 50 | 3.0 | 871 | 1.4 | 0.26 | | 2.7 | 1.8 | 53 | 504 | 65 |
| 20 | 50 | 2.0 | 871 | 0.75 | 0.24 | | 1.3 | 1.2 | 59 | 442 | 135 |
| 21 | 50 | 2.0 | 927 | 0.94 | 0.27 | 1.2 | | 1.5 | 50 | 344 | 90 |
| 22 | 50 | 1.0 | 760 | 0.33 | 0.24 | | 0.6 | 2.0 | 195 | 653 | 144 |
| 23 | 50 | 1.0 | 816 | 0.38 | 0.24 | | 0.6 | 2.3 | 154 | 614 | 96 |
| 24 | 50 | 1.0 | 871 | 0.49 | 0.23 | | 0.4 | 2.7 | 115 | 443 | 81 |
| 25 | 50 | 1.0 | 927 | 0.65 | 0.26 | | 0.7 | 1.9 | 68 | 336 | 70 |
| 26 | 25 | 3.0 | 760 | 1.5 | 0.19 | | 0.8 | 0.4 | 144 | 375 | 87 |
| 27 | 25 | 3.0 | 816 | 2.0 | 0.19 | | 1.1 | 0.5 | 68 | 302 | 53 |
| 28 | 25 | 2.0 | 871 | 1.8 | 0.19 | | 0.7 | 0.6 | 77 | 272 | 82 |
| 29 | 25 | 2.0 | 927 | 1.6 | 0.31 | | 0.6 | 0.8 | 38 | 208 | 47 |
| 30 | 25 | 1.0 | 760 | 1.0 | 0.19 | | 0.3 | 0.5 | 165 | 375 | 103 |
| 31 | 25 | 1.0 | 816 | 1.0 | 0.18 | | 0.3 | 0.7 | 104 | 313 | 74 |
| 32 | 25 | 1.0 | 871 | 1.1 | 0.19 | | 0.2 | 1.0 | 91 | 269 | 59 |
| 33 | 25 | 1.0 | 927 | 1.6 | 0.20 | | 0.3 | 0.9 | 63 | 188 | 47 |
| 34 | 25 | 1.0 | 982 | 1.1 | 0.33 | | 0.3 | 2.5 | 34 | 170 | 34 |
| 35 | 25 | 0.5 | 982 | 1.3 | 0.27 | | 0.2 | 2.0 | 50 | 139 | 31 |

Products of higher permeabilities may be made with a coarser or higher permeability expanded perlite, a lower diatomite to perlite ratio, and/or a higher soda ash dosage.

TABLE V

Examples of Composites Made from Diatomite A, CP-4000P and Soda Ash

| Ex. No. | DE wt % | Soda Ash wt % | Temp. ° C. | Perm. darcy | WBD g/cm$^3$ | Cristobalite wt % | Opal-C/CT wt % | EBC Solubility, ppm As | Al | Ca | Fe |
|---|---|---|---|---|---|---|---|---|---|---|---|
| 36 | 50 | 5.0 | 760 | 1.7 | 0.17 | | 1.6 | 1.0 | 168 | 532 | 65 |
| 37 | 50 | 7.0 | 704 | 1.9 | 0.18 | | 2.3 | 1.1 | 336 | 530 | 118 |
| 38 | 50 | 7.0 | 760 | 2.6 | 0.22 | 2.9 | | 0.9 | 162 | 430 | 83 |

TABLE V-continued

Examples of Composites Made from Diatomite A, CP-4000P and Soda Ash

| Ex. No. | DE wt % | Soda Ash wt % | Temp. ° C. | Perm. darcy | WBD g/cm$^3$ | Crist-obalite wt % | Opal-C/CT wt % | EBC Solubility, ppm As | Al | Ca | Fe |
|---|---|---|---|---|---|---|---|---|---|---|---|
| 39 | 25 | 5.0 | 760 | 3.9 | 0.15 | | 1.2 | 0.6 | 94 | 314 | 38 |
| 40 | 25 | 7.0 | 704 | 4.0 | 0.15 | | 1.1 | 0.8 | 215 | 346 | 87 |
| 41 | 25 | 7.0 | 760 | 2.1 | 0.28 | | 1.3 | 0.6 | 78 | 248 | 38 |
| 42 | 5 | 5.0 | 760 | 4.5 | 0.15 | | 0.2 | 0.4 | 66 | 126 | 29 |
| 43 | 5 | 7.0 | 704 | 4.8 | 0.14 | | 0.2 | 0.4 | 94 | 166 | 52 |
| 44 | 5 | 7.0 | 760 | 1.3 | 0.39 | | 0.4 | 0.3 | 48 | 78 | 26 |
| 45 | 50 | 1.0 | 927 | 0.74 | 0.20 | | 0.6 | 3.6 | 76 | 368 | 59 |
| 46 | 25 | 1.0 | 927 | 2.0 | 0.16 | | 0.4 | 2.1 | 63 | 206 | 44 |
| 47 | 5 | 1.0 | 927 | 3.9 | 0.14 | | <0.1 | 0.8 | 66 | 66 | 23 |
| 48 | 50 | 1.0 | 982 | 1.0 | 0.27 | | 0.5 | 4.4 | 45 | 273 | 50 |
| 49 | 25 | 1.0 | 982 | 2.0 | 0.26 | | 0.4 | 3.0 | 39 | 150 | 39 |
| 50 | 5 | 1.0 | 982 | 4.0 | 0.24 | | 0.2 | 1.6 | 67 | 56 | 24 |

Non- or low crystalline silica composites of a wide permeability range can also be made without a fluxing agent, as demonstrated in Examples 51-74 of Table VI. The products of these examples contain less than detectable amount of quartz and cristobalite, and the vast majority of the group contain 0.1 wt % or less opal-C/CT. This is especially valuable for making composites of relatively higher diatomite to perlite ratios. Diatomite is considered to be the primary filtration functioning component in the composites because of its ability to filter finer particles as compared to expanded perlite. Thus, a higher diatomite to perlite ratio is desired for composite filtration media for filtration of fine or small particles, or in other words, for applications requiring a size exclusion of finer particles and/or where fine particles must be removed from a liquid.

TABLE VI

Examples of Diatomite A Based Composites Made without a Fluxing Agent

| Ex. No. | DE wt % | Temp. ° C. | Perm. darcy | WBD g/cm$^3$ | Opal-C wt % | EBC Solubility, ppm As | Al | Ca | Fe |
|---|---|---|---|---|---|---|---|---|---|
| CP-4000P based composites | | | | | | | | | |
| 51 | 25 | 927 | 1.5 | 0.14 | 0.1 | 2.2 | 101 | 265 | 37 |
| 52 | 50 | 954 | 0.70 | 0.21 | <0.1 | 5.3 | 94 | 351 | 46 |
| 53 | 25 | 954 | 1.7 | 0.16 | <0.1 | 3.0 | 91 | 197 | 37 |
| 54 | 5 | 954 | 3.4 | 0.13 | <0.1 | 1.7 | 106 | 108 | 29 |
| 55 | 25 | 982 | 1.9 | 0.18 | <0.1 | 3.0 | 62 | 160 | 27 |
| CP-1400P based composites | | | | | | | | | |
| 56 | 50 | 760 | 0.25 | 0.25 | 0.2 | 2.5 | 139 | 720 | 78 |
| 57 | 25 | 760 | 0.84 | 0.20 | <0.1 | 0.7 | 108 | 372 | 50 |
| 58 | 50 | 816 | 0.29 | 0.25 | <0.1 | 2.6 | 165 | 642 | 57 |
| 59 | 25 | 816 | 0.91 | 0.19 | <0.1 | 1.0 | 129 | 350 | 36 |
| 60 | 50 | 871 | 0.33 | 0.24 | 0.1 | 3.6 | 137 | 516 | 46 |
| 61 | 25 | 871 | 0.93 | 0.19 | <0.1 | 0.8 | 115 | 271 | 34 |
| 62 | 50 | 927 | 0.42 | 0.26 | <0.1 | 2.9 | 114 | 338 | 48 |
| 63 | 25 | 927 | 1.1 | 0.20 | <0.1 | 1.1 | 86 | 189 | 32 |
| 64 | 5 | 927 | 1.9 | 0.16 | <0.1 | 0.7 | 79 | 104 | 23 |
| 65 | 50 | 982 | 0.65 | 0.27 | <0.1 | 4.2 | 82 | 285 | 39 |
| 66 | 25 | 982 | 1.2 | 0.23 | <0.1 | 2.6 | 58 | 149 | 29 |
| 67 | 25 | 1038 | 0.91 | 0.41 | <0.1 | 2.2 | 35 | 82 | 27 |
| CP-600P based composites | | | | | | | | | |
| 68 | 50 | 927 | 0.25 | 0.31 | 0.1 | 3.8 | 101 | 308 | 46 |
| 69 | 25 | 927 | 0.79 | 0.26 | <0.1 | 1.7 | 75 | 146 | 27 |
| 70 | 5 | 927 | 1.1 | 0.24 | <0.1 | 1.2 | 76 | 51 | 58 |
| 71 | 50 | 982 | 0.40 | 0.33 | <0.1 | 4.3 | 73 | 222 | 38 |
| 72 | 25 | 982 | 1.1 | 0.28 | <0.1 | 2.1 | 55 | 58 | 50 |

TABLE VI-continued

Examples of Diatomite A Based Composites Made without a Fluxing Agent

| Ex. No. | DE wt % | Temp. ° C. | Perm. darcy | WBD g/cm$^3$ | Opal-C wt % | EBC Solubility, ppm As | Al | Ca | Fe |
|---|---|---|---|---|---|---|---|---|---|
| 73 | 5 | 982 | 1.7 | 0.27 | <0.1 | 0.8 | 60 | 43 | 25 |
| 74 | 75 | 982 | 0.19 | 0.32 | <0.1 | 5.6 | 78 | 399 | 47 |

Applicants also tested potassium carbonate and potassium silicate as fluxing agents as shown in Examples 75-82 in Table VII. None of the composite products contains cristobalite. A 50/50 blend of Diatomite A and CP-1400P perlite, 5 wt % potassium carbonate and calcination at 816° C. resulted in a composite of 1.3 darcy and 1.2 wt % opal-C/CT (Example 76). This product made with potassium carbonate is slightly less permeable and has a lower content of opal-C/CT than that made under the same conditions but instead using 5 wt % soda ash, which resulted in 1.8-darcy permeability and 3.9 wt % opal-C/CT (Example 12). Similarly, a 25/75 blend of diatomite and CP-4000P perlite, 5 wt % potassium carbonate and calcination at 760° C. resulted in a composite of 2.5 darcy and 0.3 wt % opal-C/CT (Example 78), as compared to the composite of 3.9 darcy and 1.2 wt % opal-C/CT made under the same conditions with 5 wt % soda ash (Example 39). Compared to soda ash, potassium carbonate only mildly reduces opal-C/CT formation but its fluxing capability is poorer. At the same dosage, potassium silicate makes products of much lower permeability than soda ash. For instance, calcining a 25/75 blend of Diatomite A and CP-4000P perlite with 5 wt % potassium silicate at 760° C. produced a product of 1.4 darcy and 1.1 wt % opal-C/CT (Example 80). Under the same conditions, 5 wt % soda ash made a product of 3.9-darcy permeability and 1.2 wt % opal-C/CT (Example 39). Further, increasing the dosage of potassium silicate to 6.8 wt % by weight to have the same molar dosage of potassium as the sodium molar dosage at 5 wt % soda ash and, at the same time, increasing the calcination temperature to 816° C. only increased the permeability of the product to 1.8 darcy while opal-C/CT content was increased to 1.4 wt % (Example 82).

TABLE VII

Examples of Composites Made with Diatomite A and a Potassium Fluxing Agent

| Ex. No. | DE wt % | Flux wt % | Temp. ° C. | Perm. darcy | WBD g/cm$^3$ | Opal-C/CT wt % | EBC Solubility, ppm As | Al | Ca | Fe |
|---|---|---|---|---|---|---|---|---|---|---|
| CP-1400P and $K_2CO_3$ based composites | | | | | | | | | | |
| 75 | 50 | 3.0 | 816 | 0.73 | 0.22 | 0.7 | 1.6 | 120 | 539 | 172 |
| 76 | 50 | 5.0 | 816 | 1.3 | 0.21 | 1.2 | 1.2 | 105 | 509 | 66 |
| CP-4000P and $K_2CO_3$ based composites | | | | | | | | | | |
| 77 | 50 | 5.0 | 816 | 1.5 | 0.20 | 1.3 | 1.4 | 61 | 518 | 50 |
| 78 | 25 | 5.0 | 760 | 2.5 | 0.17 | 0.3 | 0.9 | 121 | 362 | 64 |
| CP-4000P and $K_2SiO_3$ based composites | | | | | | | | | | |
| 79 | 50 | 5.0 | 816 | 0.52 | 0.23 | 1.3 | 1.9 | 123 | 550 | 203 |
| 80 | 25 | 5.0 | 760 | 1.4 | 0.17 | 1.1 | 1.1 | 190 | 406 | 178 |
| 81 | 25 | 5.5 | 816 | 1.6 | 0.17 | 1.4 | 1.1 | 94 | 382 | 105 |
| 82 | 25 | 6.8 | 816 | 1.8 | 0.17 | 1.4 | 1.0 | 78 | 398 | 84 |

TABLE VIII

Flux-calcined Diatomite C and Composite Based on Diatomite C

| Ex. No. | DE-C wt % | EP-1400P wt % | Soda ash wt % | Temp. ° C. | Perm. darcy | WBD g/cm$^3$ | 22° 2θ Peak d Å | 22° 2θ Peak FWHM ° 2θ | 28.5° 2θ Peak | Opal-C wt % |
|---|---|---|---|---|---|---|---|---|---|---|
| 83 | 100 | 0 | 5 | 1104 | 5.2 | 18.8 | 4.06 | 0.49 | no | 21.5 |
| 84 | 70 | 30 | 5 | 816 | 17.2 | 17.2 | 4.08 | 0.44 | poor | 15.7 |

Figure 2:
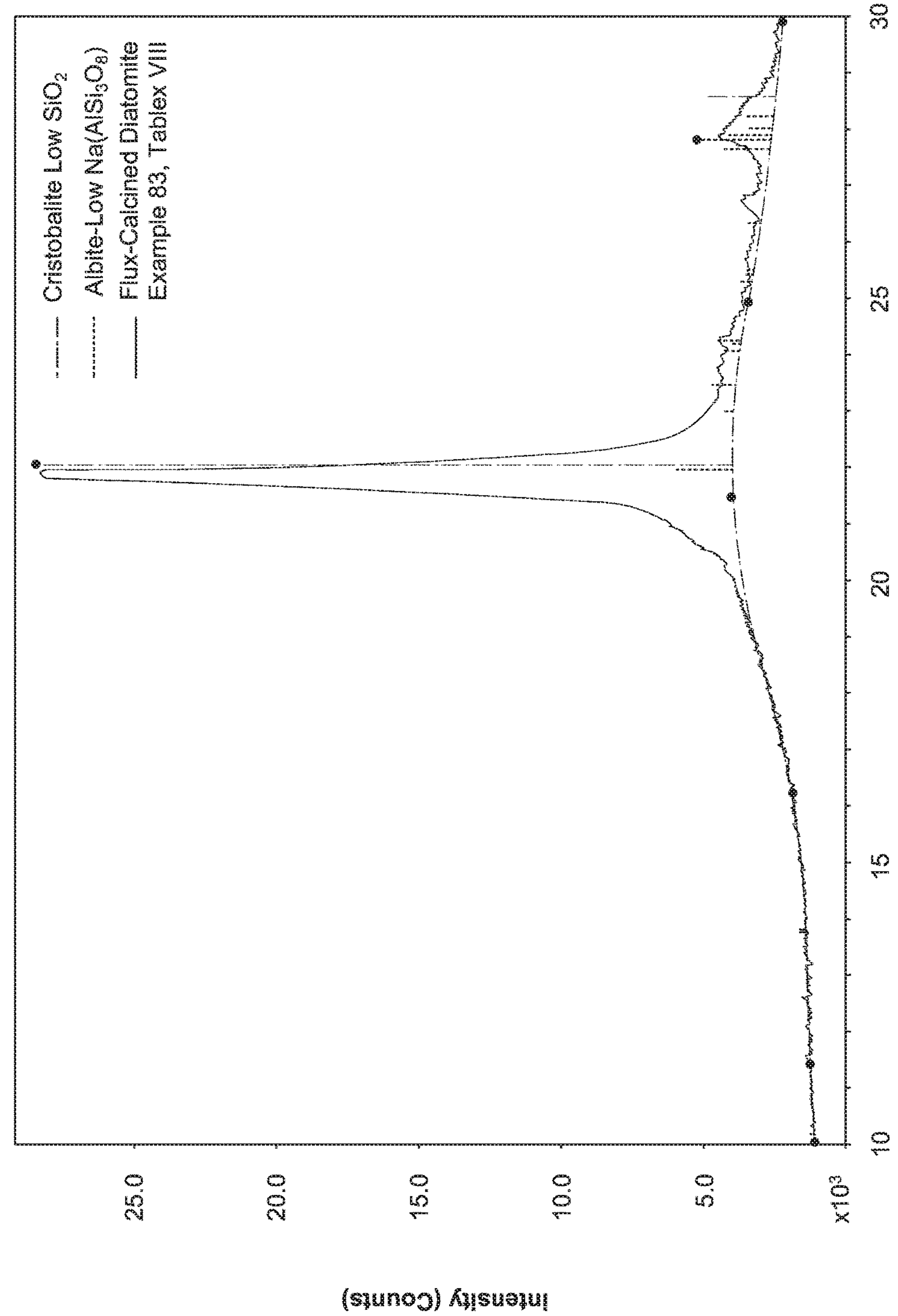
FIG. 2 shows the x-ray diffraction pattern of a flux-calcined diatomite (Example 83, Table VIII)
Figure 3:
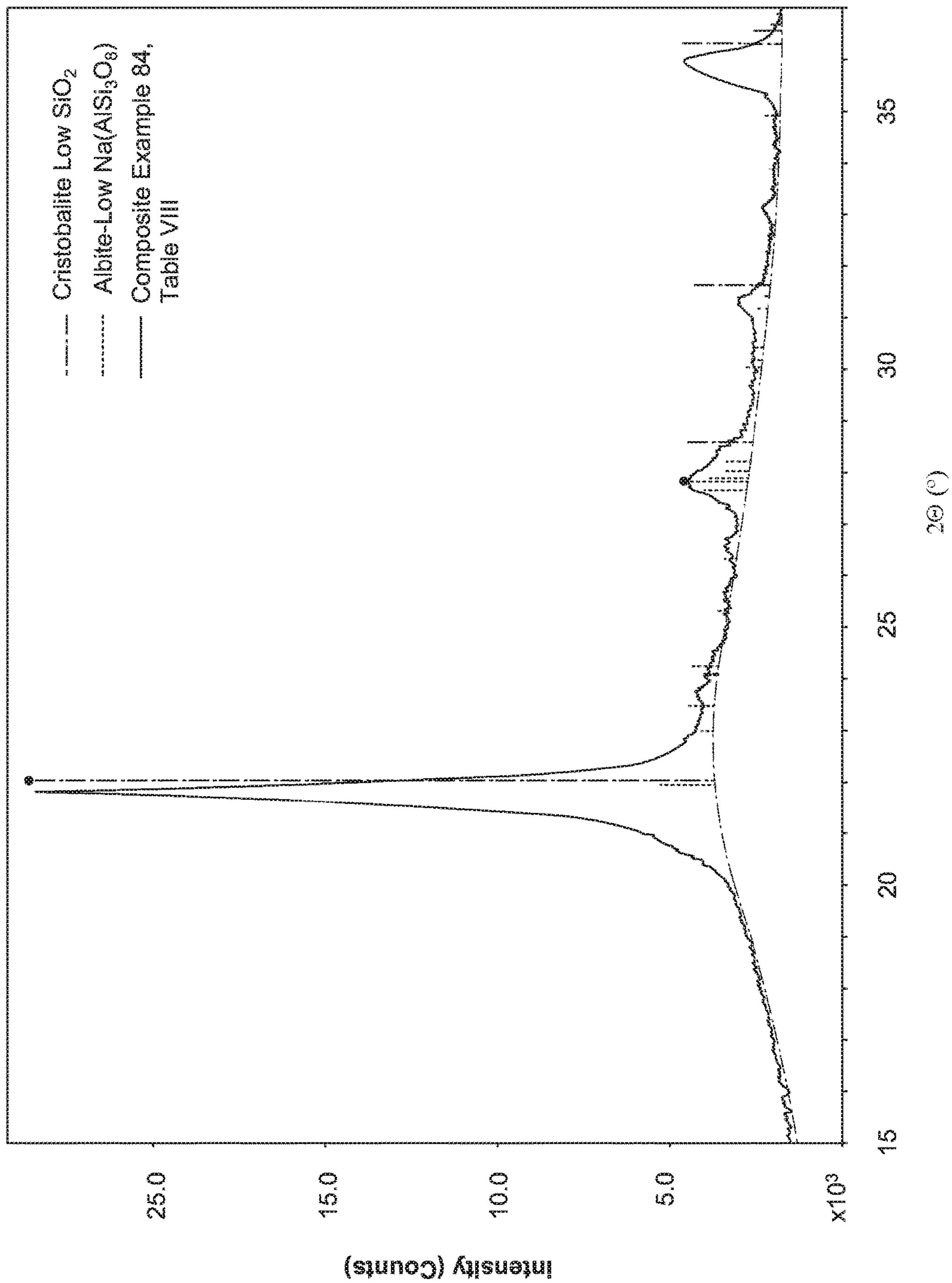
FIG. 3 shows the x-ray diffraction pattern of the composite produced from a flux-calcined diatomite (Example 84. Table VIII)

Shown in Table VIII are a flux-calcined diatomite (Diatomite C) and a composite based on Diatomite C. The flux-calcined diatomite (Example 83) has a permeability of about 5.2 darcy and contains <1 wt % quartz, no cristobalite and about 22 wt % opal-C, as evidenced by the centroid location and FWHM of its 22° 2θ peak (see FIG. 2). The composite (Example 84) made from this flux-calcined diatomite and perlite with 5 wt % soda ash has a permeability of about 17.2 darcy and a WBD of 17.2 lbs/ft$^3$ (0.28 g/cm$^3$). It contains about 16 wt % opal-C, no cristobalite and <0.1 wt % quartz, based on its XRD scan pattern (FIG. 3). These examples demonstrate that non-crystalline silica sodium flux-calcined high permeability diatomite filtration media or a non-crystalline silica sodium flux-calcined high permeability composite filtration media of diatomite and perlite can be made from a carefully selected diatomite raw material of specific chemistry which is specified in Lenz et al.

The inventors of the present disclosure have demonstrated that cristobalite may be formed during preparation of diatomite-perlite composite filtration media under certain conditions: 1) calcining a feed blend of 50 wt % or more diatomite with 2 wt % or more soda ash at a temperature of about 927° C. or higher, or 2) calcining a feed blend of 50 wt % or more diatomite with 7 wt % or more soda ash at a temperature of about 760° C. or higher. Although opal-C/CT was not differentiated from cristobalite in the prior art disclosure (U.S. Pat. Nos. 6,524,489 and 5,776,353), one of ordinary skill in the art understands from such prior art that the soda ash fluxed products disclosed in the prior art clearly contain cristobalite: Example 4 (prior art) was made with 70 wt % diatomite and 2 wt % soda ash at 1700° F. (927° C.), Example 12 (prior art) with 90 wt % diatomite and 7 wt % soda ash at 1562° F. (850° C.), and Example 9 (prior art), as discussed above, was made with 90% of a highly flux-calcined and high cristobalite diatomite. Celite® 560, and 5 wt % soda ash at 1500° F. (816° C.).

The existing prior art demonstrated that composites of perlite and diatomite could be produced but composites comprising more than about 5% diatomite without the use of a boric acid flux and free of cristobalite were not taught, suggested or disclosed in the prior art. It is therefore surprising and unexpected that, the inventors of the present disclosure have shown that diatomite-perlite composite filter media can be produced without forming cristobalite through not one or two, but through at least seven different approaches, which are: 1) calcining a feed blend of 75 wt % or less diatomite at a temperature of about 982° C. or lower, 2) calcining a feed blend of 75 wt % or less diatomite with 5 wt % or less soda ash at a temperature of about 871° C. or lower; 3) calcining a feed blend of 50 wt % or less diatomite with 7 wt % or less soda ash at a temperature of about 704° C. or lower, 4) calcining a feed blend of 25 wt % or less diatomite with 7 wt % or less soda ash at a temperature of about 760° C. or lower; 5) calcining a feed blend of 50 wt % or less diatomite with 5 wt % or less potassium carbonate at a temperature of about 816° C.; 6) calcining a feed blend of 50 wt % or less diatomite with 6.8 wt % potassium silicate at a temperature of about 816° C.) or lower; and 7) calcining a feed blend of 50 wt % or less diatomite with 5.6 wt % or less borax at a temperature of about 816° C. or lower. The above listed parameters for producing a cristobalite-free diatomite-perlite composite are for demonstration purpose and should not be taken as limitation and/or boundaries.

In addition, careful selection of the diatomite and perlite components having very low or non-detectable levels of quartz have been shown to contribute to the production of composite products containing very low or non-detectable quartz content and thus a non-detectable or very low level of total crystalline silica content. While not common in nature, diatomite containing very low levels of quartz may also be obtained by beneficiating diatomite ores to remove quartz and other mineral impurities prior to sintering.

Very low quartz perlite may be obtained by using a perlite ore that is free of quartz or by selecting an expanded perlite in which the quartz has been removed during expansion or post-expansion processes. In an embodiment, crystalline silica content in the expanded perlite powder used for the feed may be reduced by beneficiation prior to sintering. The perlite products used in the examples all contain non-detectable levels of quartz because the perlite ore selected for the manufacture of these products was substantially free of quartz.

In some embodiments, the combined feed (that contains the diatomite and perlite components) may have a crystalline silica content of less than 1 wt % prior to calcination (sintering). In another embodiment, the combined feed may have a crystalline silica content of less than 0.5 wt % prior to calcination. Most of the examples of the resulting composite products (powdered composite filtration media) listed in this application contain non-detectable or less than 0.1 wt % quartz. Examples 85-86 of Table IX are composites made by calcination at 982° C. from 50/50 blends of CP-1400P and Diatomite A with or without reduced mineral impurities. In both Examples 85 and 86, the composites had <0.1 wt % opal-C/CT and <0.1 wt % quartz.

TABLE IX

Examples of Quartz Contents of Composites Made with 50 wt % CP-1400P without A Fluxing Agent at 982° C.

| Ex. | Diatomite | | Perm. | WBD | Opal-C/CT | Quartz |
|---|---|---|---|---|---|---|
| No. | Type | Quartz, wt % | darcy | g/cm$^3$ | wt % | wt % |
| 85 | A | 0.15 | 0.56 | 0.30 | <0.1 | <0.1 |
| 86 | A1 | <0.1 | 0.50 | 0.30 | <0.1 | <0.1 |

As shown in the above examples, by using no flux or a low sodium flux dose and avoiding over-calcination, the amorphous silica content of the diatomite raw materials will not convert to quartz during the formation of the composite, and further, the expanded perlite component will not devitrify to form quartz during the composite formation process.

Diatomite-perlite composite filtration media made without or with a low dosage of soda ash also have reduced soluble metal content. When the content of the fluxing agent is reduced, a higher calcination temperature is needed to complete the particle agglomeration required to achieve a wide permeability range. Applicants have shown that with a reduced flux content, higher calcination temperatures can be applied without the large increases in product density caused by over-calcination. The higher calcination temperature also reduces the solubility of certain undesirable metals. Example 17 (see Table IV) is a composite made from a 50/50 blend of Diatomite A and CP-1400P expanded perlite with 3 wt % soda ash at 760° C. and possessing a permeability of 0.67 darcy and 1.5 wt % opal-C/CT. In contrast, Example 65 (see Table VI) shows a composite made from the same feed blend without a fluxing agent, calcined at 982° C. possessing a permeability of 0.65 darcy and <0.1 wt % opal-C/CT. Not only is the opal-C/CT level reduced through the reduction of the flux and the increase in calcination temperature, but the solubilities of Al, Ca and Fe, as determined by the EBC method, were reduced from 285, 628 and 183 to 82, 285 and 39 ppm, respectively, which are all extremely attractive levels in many food, chemical and beverage filtration processes.

The solubilities of impurities may also be controlled by careful selection of raw materials. For instance, Examples 87-89 of Table X show composite filtration media made from Diatomite B and CP-1400P. These composite products contain <0.1 wt % quartz and cristobalite is absent. Without using a fluxing agent, the Diatomite B based products of Table X have lower As, Ca and Fe solubilities as compared to those Diatomite A based composites of otherwise the same formulations (comparing Examples 87-89 of Table X with Examples 71-73 of Table VI).

TABLE X

Examples of Composites of Diatomite B and CP-1400P without A Fluxing Agent

| Ex. | DE wt | Temp. | Perm. | WBD | Quartz | Opal-C/CT | EBC Solubility, ppm | | | |
|---|---|---|---|---|---|---|---|---|---|---|
| No. | % | ° C. | darcy | g/cm$^3$ | wt % | wt % | As | Al | Ca | Fe |
| 87 | 50 | 982 | 0.82 | 0.27 | <0.1 | <0.1 | 2.1 | 106 | 164 | 36 |
| 88 | 25 | 982 | 1.8 | 0.22 | ND | <0.1 | 1.6 | 72 | 73 | 26 |
| 89 | 5 | 982 | 3.0 | 0.21 | ND | <0.1 | 0.7 | 58 | 8 | 20 |

ND—non-detectable

As shown in Table I, the diatomite and perlite feed materials for making composite filter media may contain minute amounts of boron, in the levels of about <100 ppm (<0.01 wt %). Composite filtration media made from these raw materials with different feed ratios and without using a boron-containing fluxing agent will have a total boron content of about <0.01 wt %. Boric acid ($H_3BO_3$) contains about 17.5 wt % boron. When it is used as a fluxing agent to make the composite filter media, say, at the 2 wt % level, it increases the boron content in the product by about 0.35 wt %. Solubility of boron of a powdered composite filtration medium can be minimized by not using a boron-containing fluxing agent. It can be seen that without using a boron containing fluxing agent, the composite filtration medium (Example 90) had less than 20 ppm soluble boron while the sample made with 2 wt % boric acid (Example 91) had more than 170 ppm soluble boron.

TABLE XI

Examples of Composites of Diatomite A and CP-1400P Made with or without out Boric Acid as Fluxing Agent

| Ex. | DE | Boric acid | Total B* | Temp. | Perm. | WBD | Qz | Opal-C/CT | EBC Solubility, ppm | | | | |
|---|---|---|---|---|---|---|---|---|---|---|---|---|---|
| No. | wt % | wt % | wt % | ° C. | darcy | g/cm$^3$ | wt % | wt % | B | As | Al | Ca | Fe |
| 90 | 40 | 0 | <0.01 | 954 | 0.24 | 0.30 | ND | <0.1 | 17 | 1.6 | 72 | 73 | 26 |
| 91 | 50 | 2.0 | 0.35 | 927 | 1.2 | 0.25 | ND | <0.1 | 171 | 0.7 | 58 | 8 | 20 |

*Estimated from feed composition and boric acid addition.
ND—non-detectable.

Listed in Tables XII and XIII are measurements on floater contents of selected expanded perlites (Examples 92 through 94 of Table XII) and diatomite-expanded perlite composites of this disclosure (Examples 95-112 of Table XIII). The perlite samples had 0.8-3.9 ml/g total floaters and 0.4-1.0 ml/g persistent floaters. The composites (see Table XIII) containing 50-95 wt % perlite (50-5 wt % diatomite) have much fewer floater particles than the corresponding expanded perlite would have contributed had these floater particles not been altered.

TABLE XII

Examples of Floater Contents of Expanded Perlite

| Ex. No. | Expanded perlite | Perm. darcy | WBD g/cm$^3$ | Floaters, % v Total | Floaters, % v Stirred (persistent floaters) | Floaters, ml/g Total | Floaters, ml/g Stirred (persistent floaters) |
|---|---|---|---|---|---|---|---|
| 92 | CP-600P | 0.8 | 0.20 | 16 | 8 | 0.8 | 0.4 |
| 93 | CP-1400P | 1.9 | 0.15 | 29 | 9 | 2.0 | 0.6 |
| 94 | CP-4000P | 2.7 | 0.13 | 35 | 10 | 3.9 | 1.0 |

TABLE XIII

Examples of Floater Contents of Selected Composite Samples

| Ex. No. | DE wt % | Fluxing Agent Type | Fluxing Agent wt % | Temp. ° C. | Perm. darcy | WBD g/cm$^3$ | Floaters, ml/g Total | Floaters, ml/g Stirred (persistent floaters) |
|---|---|---|---|---|---|---|---|---|
| Diatomite A & CP-600P based composites | | | | | | | | |
| 95 | 5 | None | | 927 | 1.1 | 0.24 | 0.2 | 0.1 |
| 96 | 25 | None | | 927 | 0.8 | 0.26 | 0.2 | 0.1 |
| 97 | 50 | None | | 927 | 0.2 | 0.31 | 0.2 | 0.1 |
| Diatomite A & CP-1400P based composites | | | | | | | | |
| 98 | 5 | None | | 927 | 1.9 | 0.16 | 0.6 | 0.2 |
| 99 | 25 | None | | 927 | 1.1 | 0.20 | 0.6 | 0.2 |
| 100 | 25 | None | | 982 | 1.2 | 0.23 | 0.2 | 0.1 |
| 101 | 25 | $Na_2CO_3$ | 5 | 760 | 2.8 | 0.19 | 0.2 | 0.1 |
| 102 | 50 | None | | 927 | 0.42 | 0.26 | 0.2 | 0.1 |
| 103 | 50 | None | | 982 | 0.65 | 0.27 | 0.2 | 0.1 |
| 104 | 50 | $Na_2CO_3$ | 5 | 760 | 1.4 | 0.21 | 0.2 | 0.1 |
| 105 | 50 | $H_3BO_3$ | 5 | 816 | 1.4 | 0.20 | 0.2 | 0.1 |
| Diatomite A & CP-4000P based composites | | | | | | | | |
| 106 | 5 | $Na_2CO_3$ | 5 | 760 | 4.5 | 0.15 | 0.2 | 0.1 |
| 107 | 25 | None | | 954 | 1.7 | 0.16 | 0.4 | 0.1 |
| 108 | 25 | $Na_2CO_3$ | 5 | 760 | 3.9 | 0.15 | 0.2 | 0.1 |
| 109 | 25 | $H_3BO_3$ | 5 | 760 | 2.5 | 0.14 | 0.2 | 0.1 |
| 110 | 50 | None | | 954 | 0.70 | 0.21 | 0.2 | 0.1 |
| 111 | 50 | $Na_2CO_3$ | 5 | 760 | 1.7 | 0.17 | 0.2 | 0.1 |
| 112 | 50 | $H_3BO_3$ | 5 | 760 | 1.2 | 0.17 | 0.2 | 0.1 |

The lower floater content of the composites described herein indicates that a large portion of the floater particles are converted to non-floaters during the calcination process taught in this application. For example, expanded perlite CP-600P (Example 92) has 0.8 ml/g total and 0.4 ml/g persistent floaters, and it could have contributed 0.4 ml/g total and 0.2 ml/g persistent floaters to a composite of 50 wt % CP-600P. However, a composite of such formulation has only 0.2 ml/g total and 0.1 ml/g persistent floaters (Example 97). Expanded perlite CP-4000P (Example 94) has 3.9 ml/g total and 1.0 ml/g persistent floaters. However, a composite containing 95 wt % CP-4000P (Example 106) has only 0.2 ml/g total and 0.1 ml/g persistent floaters. Most of the well calcined composites of diatomite-expanded perlite of this invention have 0.2-0.6 ml/g total and 0.1-0.2 ml/g persistent floaters.

Some of the powdered composite filtration media comprising diatomite and expanded perlite were tested for filtration performance against regular diatomite products. The fluids filtered included an Ovaltine® drink, an apple juice, and a home brew light beer. All the filtration tests were conducted in a small lab pressure filter, having a horizontal filter area of 13.4 cm$^2$ and a PZ80 septum. A peristaltic pump delivered one of the fluids to the filter at a set flow rate, the pressure inside the filter chamber was monitored by an analogue gauge, and a filtrate sample was measured for turbidity once every 5 minutes using a HACH® Ratio/XR Turbidimeter, as is known how to do by those of ordinary skill in the art. A "precoat" layer of certain thickness of a powdered composite filtration medium was formed on the filter area before starting filtration. The quantity of the powdered composite filtration medium was determined from its wet bulk density and the surface area of the septum (13.4 cm$^2$). The powdered composite filtration medium was suspended in about 15-ml of deionized (DI) water and pumped to the filter with the filtrate being recirculated. The precoat time was fixed at 6 minutes. For each filtration test, a prescribed amount of powdered composite filtration medium was added to the fluid to be filtered as "body-feed" and the slurry was agitated for 30 minutes before starting filtration.

Examples 113 through 120 of Table XIV demonstrate the superior filtration performance of the diatomite-expanded perlite composite filtration media in comparison with regular diatomite products. An Ovaltine® chocolate malt powder was used for making up an aqueous Ovaltine® suspension for filtration tests. The particular aqueous suspension used in the testing contained about 14 wt % water insoluble or total suspended solids (TSS), as determined by filtering a suspension through a 0.45-μ membrane filter.

The fluid used for filtration tests was prepared by dispersing 3.50 g of Ovaltine powder in about 100-ml DI water, followed by sonication for 60 seconds and then dilution to 1.0 liter with DI water, resulting in a suspension containing 0.5 g/L TSS. The apple juice used was prepared by mixing a cloudy apple juice with a clear one, both purchased from a grocery store, and decantation to remove access solids. The mixture contained about 1.3 g/L TSS as determined by the same method described above. The beer was brewed in the lab from a home brewing kit. A supernatant of the brewed beer was obtained by decantation for the filtration tests and was determined to have 0.5 g/L TSS.

Figure 4:
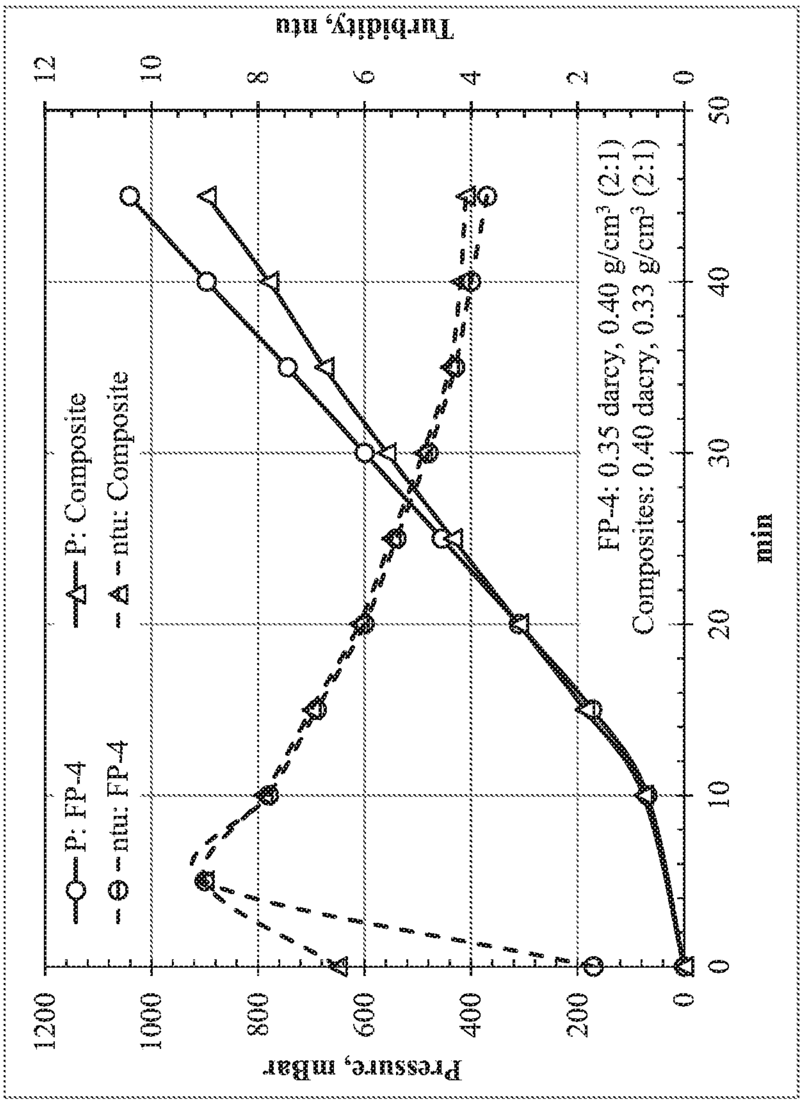
FIG. 4 graphically compares the performance of a disclosed powdered composite filtration medium against an existing diatomite product (Celatom® FP-4) when filtering an aqueous suspension of Ovaltine® (Examples 113-114; Table XIV) (in parentheses are body-feed to TSS ratio, same below)
Figure 5:
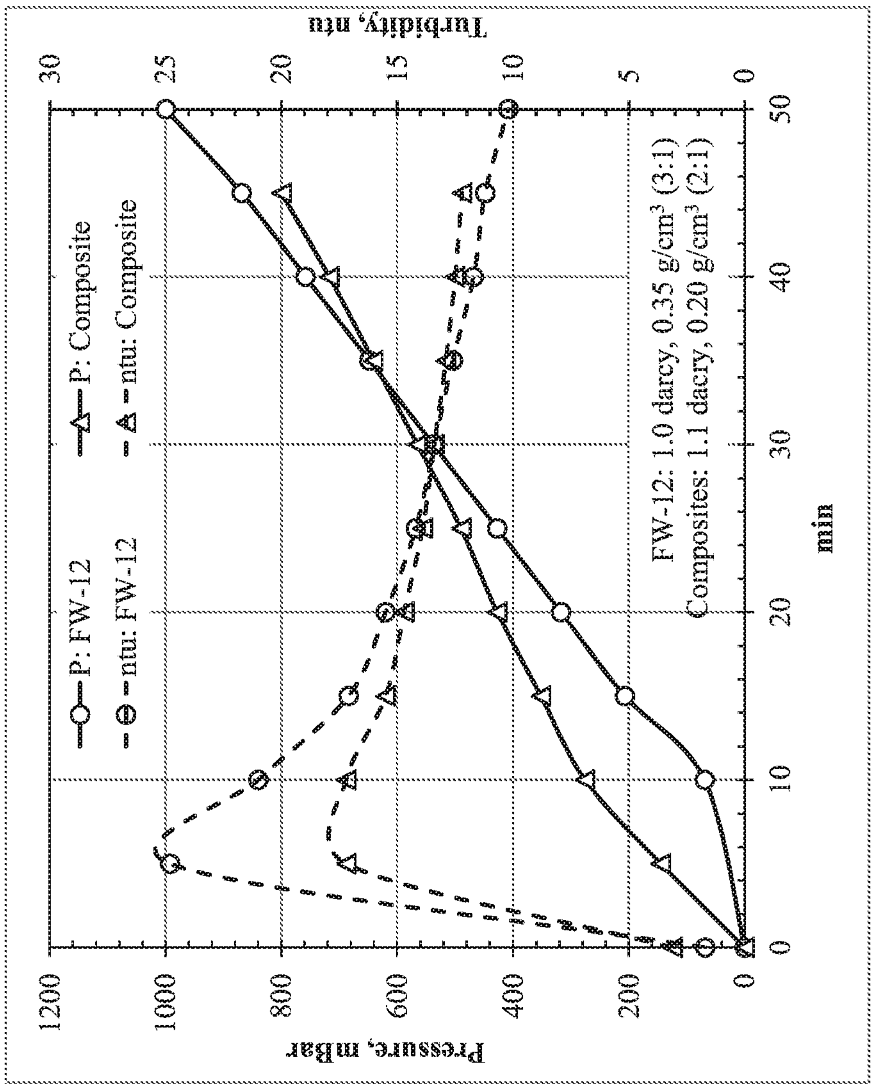
FIG. 5 graphically compares the performance of another disclosed powdered composite filtration medium against an existing diatomite product (Celatom® FW-12) when filtering an aqueous suspension of Ovaltine® (Examples 115-116; Table XIV)

Examples 113 through 116 show the results from filtering the Ovaltine® suspension. The filtration tests were conducted with a fixed precoat thickness of 1.6 mm (1/16"), using the same powdered composite filtration medium for both precoat and body-feed, and a fixed peristaltic pump flow rate of 40 ml/min for the precoat. The filtration flow rate was maintained at a constant 20 ml/min for filtration with the products of or similar to the "calcined" grades (<0.5 darcy; Examples 113-114; FIG. 4) and 40 ml/min for filtration with or the products of or similar to the "flux-calcined" grades (>0.5 darcy; Examples 115-116; FIG. 5). Examples 113-116 of Table XIV and FIGS. 4-5 illustrate that the composite filtration media of diatomite and expanded perlite were able to provide similar clarity and process cycle times as popular diatomite products from EP Minerals (Celatom® FP-4 and FW-12) and in some cases, these results were achieved when 30 wt % less, by weight, of the composite product was used compared to the currently available diatomite products.

Figure 6:
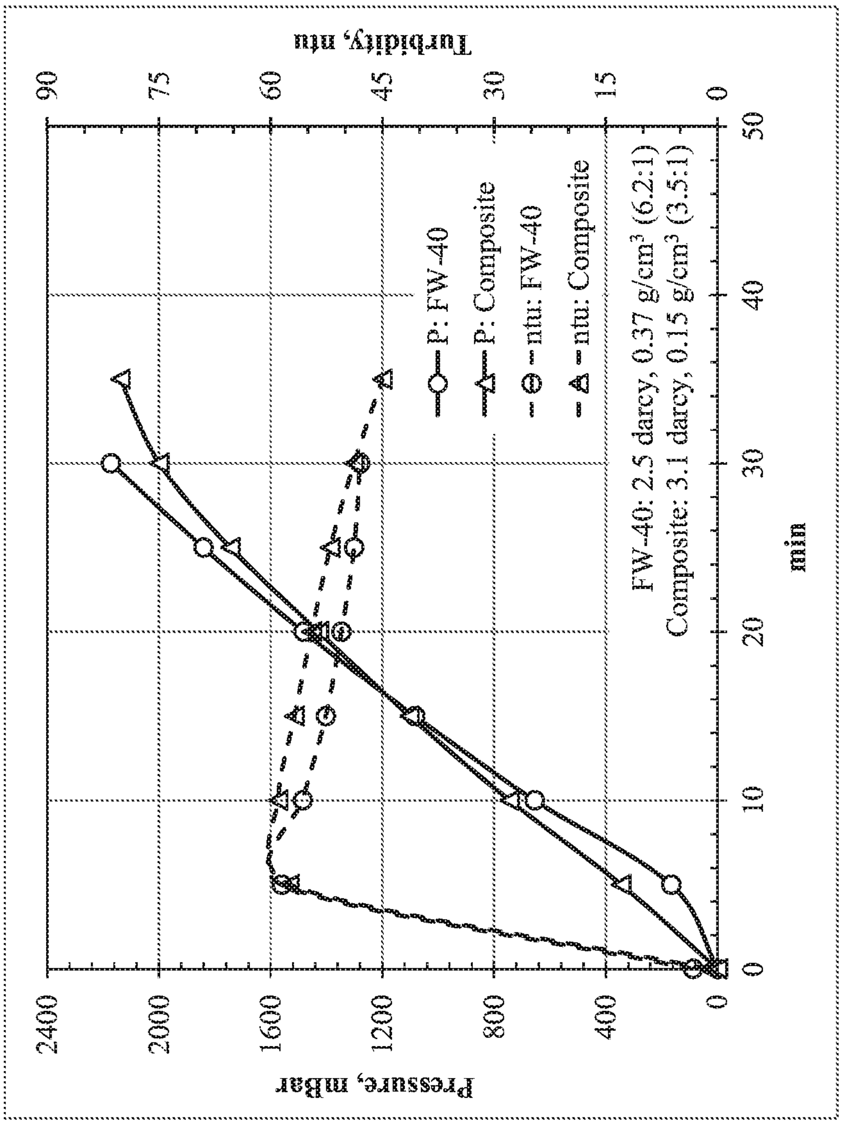
FIG. 6 graphically compares the performance of yet another disclosed powdered composite filtration medium against an existing diatomite product (Celatom® FW-40) when filtering apple juice (Examples 117-118; Table XIV)

Examples 117 and 118 and FIG. 6 show the apple juice filtration results. These filtration tests were conducted with a fixed precoat thickness of 3.2 mm (1/8"), but otherwise in a manner the same as described in the preceding paragraph. Examples 117-118 and FIG. 6 illustrate that a composite filtration media of 15 wt % diatomite and 85 wt % expanded perlite had a similar filtration performance as Celatom® FW-40 diatomite filtration medium at about 55 wt % mass usage (45 wt % less composite required).

Figure 7:
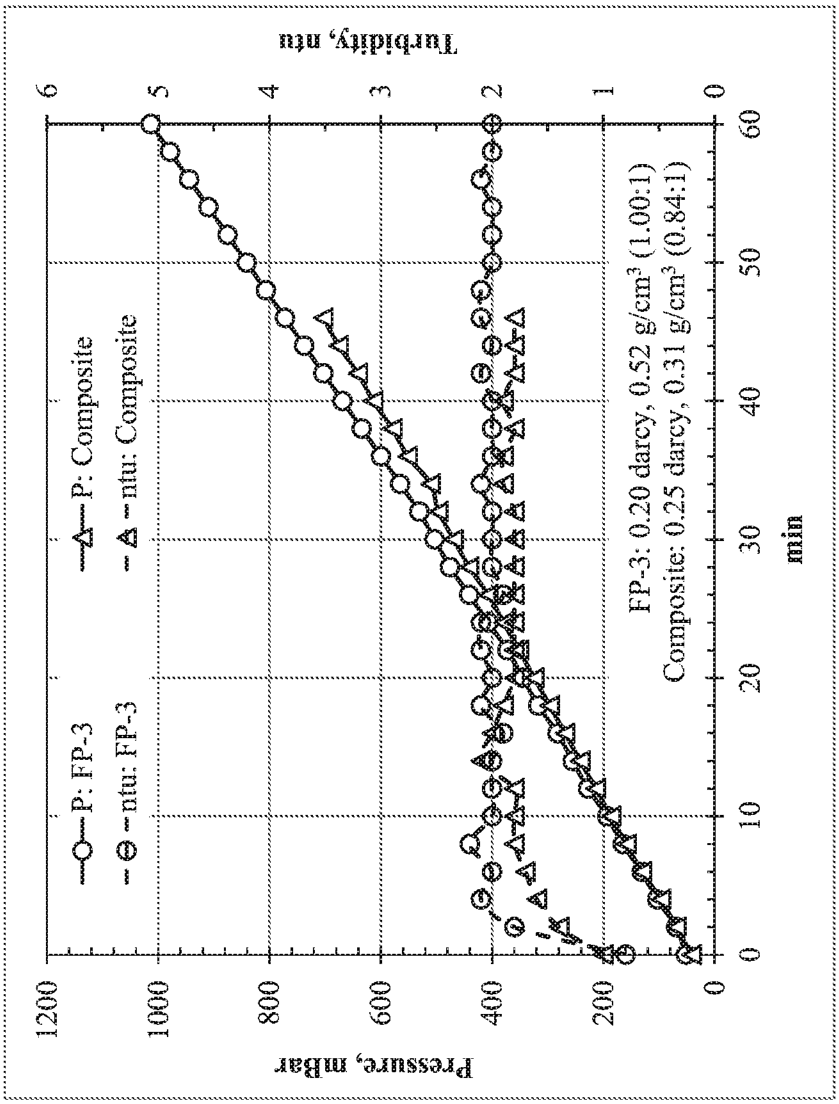
FIG. 7 graphically compares the performance of still another disclosed powdered composite filtration medium against an existing diatomite product (Celatom® FP-3) when filtering beer (Examples 119-120; Table XIV).

Examples 119-120 and FIG. 7 show the beer filtration results. The filtration tests again were conducted with a fixed precoat thickness of 3.2 mm (1/8") but at 30 ml/min for both precoat and filtration. These examples demonstrate that a composite filtration medium of 50 wt % diatomite and 50 wt % expanded perlite had a similar filtration performance as Celatom® FP-3 diatomite filtration medium at about 85 wt % mass usage (15 wt % less composite used).

TABLE XIV

Examples of Filtration Performance of Diatomite A Based Composites

| | | Perlite | | Soda Ash, | Perm. | WBD | Precoat | Body- | Filtration flowrate |
|---|---|---|---|---|---|---|---|---|---|
| Ex. No. | Filter Media | Type | wt % | wt % | darcy | g/cm$^3$ | mm | feed:TSS | ml/min |
| Ovaltine (0.5 g/L TSS, >2000 ntu) Filtration Tests | | | | | | | | | |
| 113 | FP-4 | N/A | N/A | 0 | 0.35 | 0.40 | 1.6 | 2:1 | 20 |
| 114 | Composite | CP-600P | 50 | 0 | 0.40 | 0.33 | 1.6 | 2:1 | 20 |
| 115 | FW-12 | N/A | N/A | N/A | 1.0 | 0.35 | 1.6 | 3:1 | 40 |
| 116 | Composite | CP-1400P | 75 | 0 | 1.1 | 0.20 | 1.6 | 2:1 | 40 |
| Apple Juice (1.3 g/L TSS, >2000 ntu) Filtration Tests | | | | | | | | | |
| 117 | FW-40 | N/A | N/A | N/A | 2.5 | 0.37 | 3.2 | 6.2:1 | 40 |
| 118 | Composite | CP-4000P | 85 | 0 | 3.1 | 0.15 | 3.2 | 3.5:1 | 40 |
| Beer (0.5 g/L TSS, 96 ntu) Filtration Tests | | | | | | | | | |
| 119 | FP-3 | N/A | N/A | 0 | 0.20 | 0.52 | 3.2 | 1:1 | 30 |
| 120 | Composite | CP-600P | 50 | 0 | 0.25 | 0.31 | 3.2 | 0.84:1 | 30 |

INDUSTRIAL APPLICABILITY

Mined diatomite is subjected to conventional diatomite pre-calcination processes such as drying and classification to remove non-diatomite impurity minerals to produce a "natural" product. Diatomite of specific properties may be selected to minimize soluble substances and/or quartz content. Diatomite may also be subjected to additional beneficiation to remove mineral impurities including quartz. Perlite ore is subjected to the conventional crushing, sizing, expansion, and post-expansion milling and classification for the removal of minerals and to achieve specific particle size distribution, floater content and permeability.

The natural diatomite and expanded perlite are blended in a desired ratio, and, optionally, a fluxing agent, preferably finely milled, are mixed with the diatomite-perlite blend, preferably in a pneumatic system and thus the prepared feed material is calcined or flux calcined. With specific formulations, the diatomite feed material may be already calcined or flux-calcined. The optional fluxing agent may also be added dry or in form of a solution, preferably aqueous. The calcination feed may be pre-agglomerated by adding a solvent, preferably water, and/or a binding agent. It may also be pre-formed by balling and/or spraying drying.

The calcination can be carried out in a conventional directly fired rotary kiln with controlled hot gas draft and temperature profile. This may also be done in other types of industrial calciners. The calcination product can be cooled and dispersed conventionally and classified if necessary.

The commercially-produced composite filtration media of diatomite and expanded perlite as described above will have a wide range of permeabilities, low or non-detectable level of crystalline silica, low soluble substances and low floater particle content, and these properties can be altered by adjusting feed formulations and process conditions to make desired property combinations. The disclosed composite filtration media can be used in commercial filtration applications where either currently diatomite and/or expanded perlite filtration media are used but with reduced or non-detectable or no crystalline silica content than most commercial diatomite filtration media products and with reduced unit consumption of the filtration media while maintaining attractive clarification and filtration cycle time performance.

The disclosed composite filtration media may be used in solid-liquid separation where, for example, the composite filtration media can be used to form a precoat on a rotary vacuum filter or used in functions of both precoat and body-feed in a pressure filtration application. The composite filtration media may also be used in solid-gas separation where, for instance, the composite filtration media are used to precoat fabric filtration media in a dust collector to enhance the efficiency of filtration and dust discharge from the fabric media.

The composite filtration medium/media may also be modified by processes such as acid washing to reduce further the levels of soluble substances. At least one adsorptive agent may be incorporated into the composite medium/media to add the adsorption capability which would allow the removal of certain undesired or desired substances from the liquid being filtered. In an embodiment, the at least one adsorbent may be selected from the group consisting of silica gel, precipitated silica, fumed silica, activated alumina, activated bleach clay, natural zeolite, synthetic zeolite and activated carbon. The adsorbent is intimately bound to the composite particles of the powdered composite filtration medium.

The composite filtration medium may also be added as a component into filter sheets or other specialty paper products containing cellulose and other additives, such as powdered filtration media and adsorbents.

In some embodiments, the powdered composite filtration medium/media disclosed above may be used in clarification or processing of other liquids (for example blood plasma processing and fractionation, cellular separation, or the like).

In some embodiments, the powdered composite filtration medium/media disclosed above spent in clarification or processing of a liquid may be subsequently regenerated through a process comprising physical, chemical, or thermal processing steps as are known in the art (for example, by pyrolysis, solvent extraction, gasification, or the like), and then used again for clarification or processing of liquids. The regeneration does not result in measurable conversion of opaline silica phases (opal-A, opal-CT or opal-C) present in the used medium/media to a form of crystalline silica in the regenerated medium. In other words, the regenerating does not result in an increase in the wt % of total cristobalite, or an increase in the wt % of quartz, or an increase in the wt % of total crystalline silica present in the filter medium/media. Thus, in an embodiment, the regenerated powdered composite filtration medium/media will have substantially the same wt % total crystalline silica as it did prior to regeneration. For example, if there was no detectable wt % crystalline silica present in a powdered composite filtration medium/media prior to regeneration, there will be no detectable wt % crystalline silica present in the powdered composite filtration medium/media after regeneration. Similarly, in an embodiment, the regenerated powdered composite filtration medium/media will have substantially the same wt % of total cristobalite as it did prior to regeneration. In an embodiment, the regenerated powdered composite filtration medium/media will have substantially the same wt % of quartz as it did prior to regeneration.

In accordance with another aspect of the disclosure, a method of regenerating a powdered composite filtration medium/media is disclosed. The method may comprise treating the used medium/media with a liquid characterized by a pH of more than 7. Another method of regenerating a powdered composite filtration medium/media is disclosed. The method may comprise applying thermal energy to the used medium/media.

The disclosures of the publication referenced below are hereby incorporated by reference into the present disclosure in its entirety: Elzea and Rice (Clays and Clay Minerals, vol. 44. pp. 492-500, 1996).

While only certain embodiments have been set forth, alternative embodiments and various modifications will be apparent from the above description to those skilled in the art. These and other alternatives are considered equivalents and within the spirit and scope of the present disclosure.

What is claimed is:

1. A powdered composite filtration medium comprising:

from about 7 wt % to about 90 wt % diatomite, and from about 93 wt % to about 10 wt % expanded perlite, wherein less than about 0.1 wt % cristobalite, less than about 0.1 wt % quartz, and from about 0.1 wt % to about 17.5 wt % combined opal C and opal CT are present in the powdered composite filtration medium, wherein at least a portion of the powdered composite filtration medium is in the form of composite particles, each composite particle including at least one diatomite particle and at least one expanded perlite particle sintered together.

2. The powdered composite filtration medium of claim 1, wherein less than 0.1 wt % total crystalline silica is present in the powdered composite filtration medium.

3. The powdered composite filtration medium of claim 1, wherein the powdered composite filtration medium has a permeability from 0.25 darcy to about 20 darcy.

4. The powdered composite filtration medium of claim 1, wherein the powdered composite filtration medium has less than about 5 ppm of soluble arsenic, less than about 180 ppm of soluble aluminum, less than about 500 ppm of soluble calcium, and less than about 80 ppm of soluble iron as measured by the EBC method.

5. The powdered composite filtration medium of claim 1, wherein the powdered composite filtration medium is a regenerated powdered composite filtration medium previously used in clarification or other processing of a liquid, wherein further the powdered composite filtration medium was regenerated by physical, chemical or thermal processes.

6. The powdered composite filtration medium of claim 5, wherein less than 0.1 wt % crystalline silica is present in the regenerated powdered composite filtration medium.

7. A method for regenerating the powdered composite filtration medium of claim 1 following use in a liquid processing application, the method comprising regenerating the powdered composite filtration medium, wherein the regenerating does not increase the total crystalline silica wt % of the powdered composite filtration medium.

8. The powdered composite filtration medium of claim 1 further comprising an adsorbent, wherein the adsorbent is selected from the group consisting of silica gel, precipitated silica, fumed silica, activated alumina, activated bleaching clay, natural zeolite, synthetic zeolite and activated carbon, wherein the adsorbent is intimately bound to the composite particles of the powdered composite filtration medium.

* * * * *